(12) United States Patent
Jackson et al.

(10) Patent No.: US 9,141,408 B2
(45) Date of Patent: Sep. 22, 2015

(54) METHOD AND SYSTEM FOR CORRECTING PORTION OF SOFTWARE APPLICATION

(75) Inventors: Wayne Jackson, Columbia, MD (US); Brian Edward Fox, Goffstown, NH (US); Mike Hansen, Potomac Falls, VA (US); Stuart McCulloch, Kenilworth (GB); Jason Van Zyl, Guelph (CA)

(73) Assignee: Sonatype, Inc., Fulton, MD (US)

( * ) Notice: Subject to any disclaimer, the term of this patent is extended or adjusted under 35 U.S.C. 154(b) by 0 days.

(21) Appl. No.: 13/554,335

(22) Filed: Jul. 20, 2012

(65) Prior Publication Data

US 2014/0026121 A1    Jan. 23, 2014

(51) Int. Cl.
*G06F 9/445*    (2006.01)

(52) U.S. Cl.
CPC ............ *G06F 9/44521* (2013.01); *G06F 9/445* (2013.01); *G06F 9/44589* (2013.01)

(58) Field of Classification Search
None
See application file for complete search history.

(56) References Cited

U.S. PATENT DOCUMENTS

| | | | |
|---|---|---|---|
| 5,615,400 A * | 3/1997 | Cowsar et al. ............... 719/332 |
| 6,167,535 A * | 12/2000 | Foote et al. ................ 714/38.11 |
| 6,282,698 B1 | 8/2001 | Baker et al. |
| 6,931,544 B1 * | 8/2005 | Kienhofer et al. ............ 717/118 |
| 7,080,355 B2 | 7/2006 | Carlson et al. |
| 7,149,734 B2 | 12/2006 | Carlson et al. |
| 7,159,206 B1 | 1/2007 | Sadhu et al. |
| 7,234,131 B1 | 6/2007 | Speyrer et al. |
| 7,322,024 B2 | 1/2008 | Carlson et al. |
| 7,340,719 B1 | 3/2008 | Bakerman et al. |
| 7,343,386 B2 | 3/2008 | Gomes et al. |
| 7,506,312 B1 | 3/2009 | Girolami-Rose et al. |
| 7,644,101 B2 | 1/2010 | Yano |
| 7,707,162 B2 | 4/2010 | Naphade et al. |
| 7,716,636 B2 | 5/2010 | Goncharenko et al. |
| 7,735,068 B2 | 6/2010 | Siddaramappa et al. |
| 7,788,632 B2 | 8/2010 | Kuester et al. |
| 7,810,087 B2 * | 10/2010 | O'Brien ........................ 717/168 |
| 7,814,078 B1 | 10/2010 | Forman et al. |
| 7,844,592 B2 | 11/2010 | Shoval et al. |
| 7,877,391 B2 | 1/2011 | Bird et al. |
| 7,958,494 B2 | 6/2011 | Chaar et al. |
| 8,037,453 B1 | 10/2011 | Zawadzki |

(Continued)

OTHER PUBLICATIONS

Google, "classpath-explorer Library which allows discovering classes at runtime," 2008, p. 1, downloaded from the Wayback Machine Internet Archive Sep. 25, 2013.*

(Continued)

*Primary Examiner* — Thuy Dao
*Assistant Examiner* — Stephen Berman
(74) *Attorney, Agent, or Firm* — Posz Law Group, PLC

(57) ABSTRACT

A computer system, method, or computer-readable medium corrects a broken portion of an application. A fingerprint indicates classes that comprise the application. The classes indicated in the fingerprint are looked up to determine whether any is broken. For a broken class, a fixed class is substituted when the broken class is loaded at class load time for the application; a fixed class method is substituted into the broken class, when the broken class is loaded at class load time; fixed byte code is substituted for broken byte code corresponding to the broken class, when the broken class is loaded at class load time; the broken class is unloaded and the fixed class is loaded instead, when the application is running; or the broken class is replaced inside the static application with the fixed class; all without replacing classes which are not broken.

21 Claims, 7 Drawing Sheets

(56) References Cited

U.S. PATENT DOCUMENTS

| | | | |
|---|---|---|---|
| 8,060,871 B2 | 11/2011 | Bernabeu-Auban et al. | |
| 8,069,182 B2 | 11/2011 | Pieper | |
| 8,104,018 B2 | 1/2012 | Chessell et al. | |
| 8,156,092 B2 | 4/2012 | Hewett et al. | |
| 8,156,120 B2 | 4/2012 | Brady | |
| 8,161,470 B2* | 4/2012 | Bottomley et al. | 717/148 |
| 8,225,281 B1 | 7/2012 | Hardinger et al. | |
| 8,280,755 B2 | 10/2012 | Stuhec et al. | |
| 8,296,251 B1 | 10/2012 | Athayde | |
| 8,327,318 B2 | 12/2012 | Chaar et al. | |
| 8,356,278 B2 | 1/2013 | Drissi et al. | |
| 8,359,285 B1 | 1/2013 | Dicker et al. | |
| 8,359,566 B2 | 1/2013 | Chaar et al. | |
| 8,359,571 B2 | 1/2013 | Clemm et al. | |
| 8,438,532 B2 | 5/2013 | Fox et al. | |
| 8,464,205 B2 | 6/2013 | Chaar et al. | |
| 8,473,894 B2 | 6/2013 | Fox et al. | |
| 8,479,159 B2 | 7/2013 | Klinger et al. | |
| 8,479,165 B1 | 7/2013 | Kawashima et al. | |
| 8,484,617 B2 | 7/2013 | Goh et al. | |
| 8,484,625 B2* | 7/2013 | Saha et al. | 717/135 |
| 8,499,284 B2 | 7/2013 | Pich et al. | |
| 8,539,437 B2 | 9/2013 | Finlayson et al. | |
| 8,543,979 B2* | 9/2013 | Arcese et al. | 717/120 |
| 8,572,550 B2 | 10/2013 | Fox et al. | |
| 8,612,936 B2 | 12/2013 | Fox et al. | |
| 8,627,270 B2 | 1/2014 | Fox et al. | |
| 8,656,343 B2 | 2/2014 | Fox et al. | |
| 8,745,572 B2 | 6/2014 | Zimmermann et al. | |
| 8,856,724 B2 | 10/2014 | Somani et al. | |
| 8,875,090 B2 | 10/2014 | Fox et al. | |
| 9,043,753 B2 | 5/2015 | Fox et al. | |
| 2002/0049962 A1 | 4/2002 | Kelbaugh et al. | |
| 2002/0052910 A1* | 5/2002 | Bennett et al. | 709/104 |
| 2002/0059475 A1* | 5/2002 | Baentsch et al. | 709/332 |
| 2003/0046282 A1 | 3/2003 | Carlson et al. | |
| 2004/0010786 A1 | 1/2004 | Cool et al. | |
| 2004/0039921 A1 | 2/2004 | Chuang | |
| 2004/0046785 A1* | 3/2004 | Keller | 345/734 |
| 2004/0117413 A1 | 6/2004 | Brown et al. | |
| 2004/0230949 A1* | 11/2004 | Talwar et al. | 717/118 |
| 2004/0243968 A1 | 12/2004 | Hecksel | |
| 2005/0086473 A1 | 4/2005 | Barkley et al. | |
| 2005/0137884 A1 | 6/2005 | Baird | |
| 2005/0204340 A1 | 9/2005 | Ruminer et al. | |
| 2005/0289066 A1 | 12/2005 | Weare | |
| 2006/0020937 A1 | 1/2006 | Schaefer | |
| 2006/0037000 A1 | 2/2006 | Speeter et al. | |
| 2006/0048097 A1 | 3/2006 | Doshi | |
| 2006/0101092 A1 | 5/2006 | Ishida et al. | |
| 2006/0149717 A1 | 7/2006 | Bird et al. | |
| 2006/0150153 A1* | 7/2006 | Altman | 717/116 |
| 2006/0265688 A1 | 11/2006 | Carlson et al. | |
| 2007/0033567 A1 | 2/2007 | Carlson et al. | |
| 2007/0050232 A1 | 3/2007 | Chang et al. | |
| 2007/0061495 A1* | 3/2007 | Cummins et al. | 710/62 |
| 2007/0061792 A1* | 3/2007 | Atsatt | 717/151 |
| 2007/0089086 A1 | 4/2007 | Ortloff | |
| 2007/0118899 A1* | 5/2007 | Sridhar et al. | 726/22 |
| 2007/0143735 A1 | 6/2007 | Clemm et al. | |
| 2007/0250829 A1 | 10/2007 | Hillier et al. | |
| 2007/0277148 A1 | 11/2007 | Venolia | |
| 2008/0028371 A1 | 1/2008 | Brothers et al. | |
| 2008/0028378 A1 | 1/2008 | Biswas et al. | |
| 2008/0066050 A1 | 3/2008 | Jain et al. | |
| 2008/0127040 A1 | 5/2008 | Barcellona | |
| 2008/0154965 A1 | 6/2008 | Pedersen | |
| 2008/0178154 A1 | 7/2008 | Basler et al. | |
| 2008/0229300 A1* | 9/2008 | O'Brien | 717/168 |
| 2008/0235680 A1 | 9/2008 | Strauss et al. | |
| 2008/0263505 A1 | 10/2008 | StClair et al. | |
| 2008/0270374 A1 | 10/2008 | Li et al. | |
| 2008/0281904 A1 | 11/2008 | Conrad et al. | |
| 2008/0307267 A1 | 12/2008 | Chandrasekaran | |
| 2008/0313595 A1 | 12/2008 | Boulineau et al. | |
| 2009/0013310 A1 | 1/2009 | Arner et al. | |
| 2009/0055809 A1 | 2/2009 | Campbell | |
| 2009/0064114 A1* | 3/2009 | Bottomley et al. | 717/148 |
| 2009/0094572 A1 | 4/2009 | Hegde et al. | |
| 2009/0119261 A1 | 5/2009 | Ismalon | |
| 2009/0133006 A1 | 5/2009 | Cheung | |
| 2009/0138843 A1 | 5/2009 | Hinton et al. | |
| 2009/0144698 A1 | 6/2009 | Fanning et al. | |
| 2009/0300404 A1 | 12/2009 | Branson et al. | |
| 2009/0307662 A1 | 12/2009 | Ackerman | |
| 2010/0023919 A1 | 1/2010 | Chaar et al. | |
| 2010/0023920 A1 | 1/2010 | Chaar et al. | |
| 2010/0058291 A1 | 3/2010 | Hahn et al. | |
| 2010/0058295 A1 | 3/2010 | Johnson et al. | |
| 2010/0063975 A1 | 3/2010 | Hayes | |
| 2010/0100543 A1 | 4/2010 | Brady | |
| 2010/0106705 A1 | 4/2010 | Rush et al. | |
| 2010/0153920 A1 | 6/2010 | Bonnett | |
| 2010/0211924 A1 | 8/2010 | Begel et al. | |
| 2010/0306730 A9 | 12/2010 | Carlson et al. | |
| 2010/0325602 A1 | 12/2010 | Kraft et al. | |
| 2010/0333067 A1 | 12/2010 | Goh et al. | |
| 2011/0010685 A1 | 1/2011 | Sureka et al. | |
| 2011/0023007 A1 | 1/2011 | Chumbley et al. | |
| 2011/0023016 A1 | 1/2011 | Khader et al. | |
| 2011/0055186 A1 | 3/2011 | Gopalakrishnan | |
| 2011/0066619 A1 | 3/2011 | Perantatos et al. | |
| 2011/0107301 A1 | 5/2011 | Chan et al. | |
| 2011/0119289 A1* | 5/2011 | Fields et al. | 707/769 |
| 2011/0137807 A1 | 6/2011 | Cha | |
| 2011/0145810 A1 | 6/2011 | Forsyth | |
| 2011/0161938 A1 | 6/2011 | Marum et al. | |
| 2011/0258162 A1 | 10/2011 | Lam | |
| 2011/0289098 A1 | 11/2011 | Oztaskent et al. | |
| 2011/0296396 A1 | 12/2011 | Kurtakov | |
| 2011/0307862 A1 | 12/2011 | Abrams et al. | |
| 2011/0314438 A1 | 12/2011 | Surazski et al. | |
| 2012/0011496 A1* | 1/2012 | Shimamura | 717/170 |
| 2012/0060148 A1 | 3/2012 | Jones et al. | |
| 2012/0110039 A1 | 5/2012 | McKay et al. | |
| 2012/0124547 A1 | 5/2012 | Halbedel | |
| 2012/0144363 A1 | 6/2012 | Bernardini et al. | |
| 2012/0159420 A1 | 6/2012 | Yassin et al. | |
| 2012/0174084 A1* | 7/2012 | Chapman et al. | 717/166 |
| 2012/0180024 A1 | 7/2012 | Gonzalez et al. | |
| 2012/0246616 A1 | 9/2012 | Frontiero et al. | |
| 2012/0317546 A1* | 12/2012 | Arcese et al. | 717/120 |
| 2012/0324419 A1 | 12/2012 | Roberts et al. | |
| 2012/0331439 A1 | 12/2012 | Zimmermann et al. | |
| 2012/0331447 A1 | 12/2012 | Nayak et al. | |
| 2013/0007704 A1 | 1/2013 | Haynes et al. | |
| 2013/0036400 A1 | 2/2013 | Bak et al. | |
| 2013/0047137 A1 | 2/2013 | Bak et al. | |
| 2013/0067426 A1 | 3/2013 | Fox et al. | |
| 2013/0067427 A1 | 3/2013 | Fox et al. | |
| 2013/0074038 A1 | 3/2013 | Fox et al. | |
| 2013/0191808 A1 | 7/2013 | Fox et al. | |
| 2013/0212562 A1 | 8/2013 | Fox et al. | |
| 2013/0227517 A1 | 8/2013 | Fox et al. | |
| 2013/0311496 A1 | 11/2013 | Fedorenko et al. | |
| 2013/0326469 A1 | 12/2013 | Fox et al. | |
| 2014/0075414 A1 | 3/2014 | Fox et al. | |
| 2014/0101633 A1 | 4/2014 | Fox et al. | |
| 2014/0115562 A1 | 4/2014 | Fox et al. | |
| 2014/0207753 A1 | 7/2014 | Fox et al. | |

OTHER PUBLICATIONS

Malabarba et al., "Runtime Support for Type-Safe Dynamic Java Classes," 2000, ECOOP 2000—Object-Oriented Programming Lecture Notes in Computer Sciencevol. 1850, pp. 337-361.*

Liang et al., "Dynamic class loading in the Java virtual machine," 1998, Proceedings of the 13th ACM SIGPLAN conference on Object-oriented programming, systems, languages, and applications, pp. 36-44.*

Goldberg, "A specification of Java loading and bytecode verification," 1998, Proceedings of the 5th ACM conference on Computer and communications security, pp. 49-58.*

(56) References Cited

OTHER PUBLICATIONS

U.S. Appl. No. 13/861,065, filed Apr. 11, 2013, Fox et al.
Milanovic et al., "Model & Metamodel, Metadata and Document Repository for Software and Data Integration", 2008, MoDELS 2008, LNCS 5301, pp. 416-430, 2008.
Sherman Steven, "A Process-Oriented Ontology for Representing Software Engineering Project Knowledge", 2009, A doctoral dissertation submitted in partial fulfillment of the requirements for the degree of Doctor of Philosophy, Graduate School of Computer and Information Sciences, Nova Southeastern University, pp. 1-244.
Notice of Allowance issued by the U.S. Patent Office on Mar. 15, 2013 in connection with related application No. 13/483,412.
Office Action issued by the U.S. Patent Office on Apr. 8, 2013 in connection with related application No. 13/151,816.
Ji et al., "Efficient Interactive Fuzzy Keyword Search", WWW 2009, Apr. 20-24, 2009, ACM 978-1-60558-487-4/09/04, pp. 371-380.
Happel et al., "Potentials and Challenges of Recommendation Systems for Software Development", Rsse '08, Copyright 2008 ACM 978-1-60558-228-3, pp. 11-15.
Maalej et al., "A Lightweight Approach for Knowledge Sharing in Distributed Software Teams", T. Yamaguchi (Ed.): PAKM 2008, LNAI 5345, pp. 14-25.
Office Action issued by the U.S. Patent Office on Apr. 9, 2013 in connection with related application No. 13/231,162.
Gardler, "Reuse Readiness Rating", 2009, pp. 1-17, downloaded from the Internet on Apr. 1, 2013 from <url>:http://www.oss-watch.ac.uk/resources/reuseReadinessRating.
Open Source Initiative, "Home", May 5, 2010, pp. 1-2, downloaded from the Waybackmachine Internet Archive on Apr. 1, 2013.
U.S. Appl. No. 13/962,122, filed Aug. 8, 2013, Fox et al.
Gacek, "Exploiting Domain Architectures in Software Reuse", 1992, ACM 0-89791-739- 1/95/0004, pp. 229-232.
Prieto-Diaz et al., "Classifying Software for Reusability", Jan. 1987, IEEE Software pp. 6-16.
Meling et al., "Storing and Retrieving Software Components: A Component Description Manager", 2000, IEE, pp. 1-11.
Robillard et al., "Recommendation Systems for Software Engineering", IEEE Computer Society, 2010, pp. 80-86.
Duan et al., "Clustering Support for Automated Tracing", ASE '07, Nov. 5-9, 2007, pp. 244-253.
David, "Recommending Software Artifacts from Repository Transactions", IEA/AIE '08 Proceedings of the 21$^{st}$ International conference on Industrial, Engineering and Other Applications of Applied Intelligent Systems: New Frontiers in Applied Artificial Intelligence, 2008, pp. 189-198.
Herbsleb, "Global Software Engineering: The Future of Socio-technical Coordination," 2007, FOSE '07 2007 Future of Software Engineering, pp. 188-198.
Kagdi et al., "A survey and taxonomy of approaches for mining software repositories in the context of software evolution," 2007, Journal of Software Maintenance and Evolution: Reseach and Practice. J. Soft. Maint. Evol.: Res. Pract. 2007; 19:77-131.
Office Action issued by the U.S. Patent Office on Jun. 18, 2013 in related U.S. Appl. No. 13/369,617.
Notice of Allowance issued by the U.S. Patent Office on Jul. 11, 2013 in related U.S. Appl. No. 13/780,525.
Notice of Allowance issued by the U.S. Patent Office on Aug. 14, 2013 in related U.S. Appl. No. 13/151,816.
Notice of Allowance issued by the U.S. Patent Office on Sep. 9, 2013 in related U.S. Appl. No. 13/231,162.
U.S. Appl. No. 13/744,542, filed Jan. 18, 2013, Fox et al.
U.S. Appl. No. 13/780,525, filed Feb. 28, 2013, Fox et al.
Cubranic et al., "Hipikat: Recommending Pertinent Software Development Artifacts," 2003, Proceedings of the 25th International Conference on Software Engineering (ICSE '03), pp. 1-11.
Cubranic et al., "Hipikat: A Project Memory for Software Development," IEEE Transactions on Software Engineering, vol. 31, No. 6, Jun. 2005, pp. 446-465.
Notice of Allowance issued by the U.S. Patent Office on Jan. 22, 2013 in connection with related application No. 13/089,751.
U.S. Appl. No. 13/089,751, filed Apr. 19, 2011, Fox et al.
U.S. Appl. No. 13/151,816, filed Jun. 2, 2011, Fox et al.
U.S. Appl. No. 13/231,162, filed Sep. 13, 2011, Fox et al.
U.S. Appl. No. 13/233,265, filed Sep. 15, 2011, Fox et al.
U.S. Appl. No. 13/369,617, filed Feb. 9, 2012, Fox et al.
U.S. Appl. No. 13/476,160, filed May 21, 2012, Fedorenko et al.
U.S. Appl. No. 13/483,412, filed May 30, 2012, Fox et al.
Sourceforge, List of Current OSS Discovery Fingerprints [online] [retrieved on May 27, 2012] Retrieved from the internet: <http://ossdiscovery.sourceforge.net/fingerprints.html>.
Sourceforge, OSS Discovery FAQ [online] [retrieved on May 27, 2012] Retrieved from the internet: <http://ossdiscovery.sourceforge.net/faq.html>.
Office Action issued by the U.S. Patent Office on Sep. 24, 2013 in connection with related application No. 13/476,160.
Cook et al., "An Extensible Framework for Collaborative Software Engineering", 2003, Proceedings of the Tenth Asia-Pacific Software Engineering Conference (APSEC'03), pp. 1-10.
Fitzpatrick et al., "CVS Integration with Notification and Chat: Lightweight Software Team Collaboration," CSCW'06, Nov.4-8, 2006, pp. 49-58.
Cleland-Huang et al., "Event-Based Traceability for Managing Evolutionary Change," IEEE Transactions on Software Engineering, vol. 29, No. 9, Sep. 2003, pp. 796-810.
Notice of Allowance issued by the U.S. Patent Office on Oct. 4, 2013 in related U.S. Appl. No. 13/369,617.
The International Search Report and the Written Opinion of the International Searching Authority mailed on Oct. 15, 2013 by the International Searching Authority in connection with international application No. PCT/US2013/041785, which corresponds to related U.S. Appl. No. 13/476,160.
Dmitriev. Safe Class and Data Evolution in Large and Long-Lived Java Applications. Mar. 2001. [retrieved on 2013-26] Retrieved from the Internet: <URL:http://citeseerx.ist.psu.edu/viewdoc/download-?doi+10.1.1.6.1812&rep+rep1&type=pdf>, entire document.
Chilowicz et al. Syntax tree fingerprinting: a foundation for source code similarity detection. Sep. 29, 2011. [Retrieved on 2013-26]. Retrieved from the Internet: <URL: http://hal-upec-mlv.archives-ouvertest.fr/docs/00/62/78/11/PDF/HAL.pdf>, entire document.
Notice of Allowance issued by the U.S. Patent Office on Jul. 9, 2014 in related U.S. Appl. No. 13/861,065.
Froehlich et al., "Unifying Artifacts and Activities in a Visual Tool for Distributed Software Development Teams," 2004, Proceedings of the 26$^{th}$ International Conference on Software Engineering, pp. 387-396.
U.S. Appl. No. 14/271,648, filed May 7, 2014, Fedorenko.
Grundy et al., "Inconsistency management for multiple-view software development environments," 1998, IEEE Transactions on Software Engineering, vol. 24, Issue: 11, pp. 960-981.
Han, "Supporting impact analysis and change propagation in software engineering environments," 1997, Proceedings Eight IEEE International Workshop on Software Technology and Engineering Practice incorporating Computer Aided Software Engineering, pp. 172-182.
U.S. Appl. No. 14/140,167, filed Dec. 24, 2013, Fox et al.
Office Action issued by the U.S. Patent Office on Mar. 10, 2014 in connection with related application No. 13/233,265.
Notice of Allowance issued by the U.S. Patent Office on Mar. 20, 2014 in related U.S. Appl. No. 13/476,160.
Gall et al., "Visualizing software release histories: the use of color and third dimension," IEEE International Conference on Software Maintenance, 1999 (ICSM '99) Proceedings, pp. 99-108.
Siobhan Clark et al., "Verifying components under development at the design stage: A Tool to support the composition of component design models", 1998, Google, 3 pages.
Mili et al., "Storing and Retrieving Software Components: A Refinement Based System", 1994, IEEE, 91-100.
Office Action issued by the U.S. Patent Office on Oct. 7, 2014 in connection with related application No. 14/078,151.
Office Action issued by the U.S. Patent Office on Oct. 22, 2014 in connection with related application No. 13/962,122.

(56) References Cited

OTHER PUBLICATIONS

Office Action issued by the U.S. Patent Office on Oct. 23, 2014 in related U.S. Appl. No. 13/233,265.

Office Action issued by the U.S. Patent Office on Nov. 26, 2014 in related U.S. Appl. No. 14/102,713.

International Preliminary Report on Patentability issued by the International Bureau of WIPO on Dec. 4, 2014 in related International application No. PCT/US2013/041785.

Notice of Allowance issued by the U.S. Patent Office on Apr. 27, 2015 in related U.S. Appl. No. 13/962,122.

Podgurski et al., "Retrieving reusable software by sampling behavior", 1993, ACM Transactions on Software Engineering and Methodology, vol. 2, Issue 3, pp. 286-303.

De Luca et al., "Recovering traceability links in software artifact management systems using information retrieval methods", 2007, ACM Transactions on Software Engineering and Methodology, vol. 16, Issue 4, Article No. 13, pp. 1-50.

Ravichandran et al., "Software reuse strategies and component markets", 2003, Communications of the ACM—Program compaction, vol. 46, Issue 8, pp. 109-114.

Notice of Allowance issued by the U.S. Patent Office on May 15, 2015 in related U.S. Appl. No. 13/744,542.

Office Action issued by the U.S. Patent Office on Jun. 26, 2015 in related U.S. Appl. No. 14/102,713.

Notice of Allowance issued by the U.S. Patent Office on May 19, 2015 in related U.S. Appl. No. 13/233,265.

Williams et al., "Automatic mining of source code repositories to improve bug finding techniques", 2005, IEEE Transaction on Software Engineering (vol. 30, Issue: 6), pp. 466-480.

Ying et al., "Predicting source code changes by mining change history", 2004, IEEE Transactions on Software Engineering (vol. 30, Issue: 9), pp. 574-586.

Storey et al., "TODO or to bug: exploring how task annotations play a role in the work practices of software developers", 2008, Proceedings of the 30th International conference on Software engineering, pp. 251-260.

\* cited by examiner

US 9,141,408 B2

METHOD AND SYSTEM FOR CORRECTING PORTION OF SOFTWARE APPLICATION

TECHNICAL FIELD

The technical field relates in general to software development, an more specifically to correcting a portion of a software application.

BACKGROUND

Today, there frequently are defects and/or security vulnerabilities or the like in pieces of software that make up an application. Often it takes time to move the fixes for the defects/vulnerabilities through the conventional process before the software application is deemed to be fixed. So, typically now if there is a bug, a developer needs to get an updated version of a piece of the software if using open source software, or a developer must pull up the source code and update the version himself, and then run it through the entire process of creating a version of the application with the update.

In practice, a developer may find out that there is a problem with an open source component that is being used in a software application. The developer will research the fix, go back into the development environment, update the component, re-run the integration test to ensure that all is functional, and then progress through the release process to release a new version. There is no way to do this without manually scouring code to find the vulnerability or bug.

In addition, there are situations where the ability to support a legacy custom application is much more problematic due to tack of understanding of the old application.

Consider Microsoft's Patch Tuesday as an example of a conventional way in which patches are released. Patch Tuesday is normally only once a month. Subsequent patches (and hence updates to pieces of software) will not be released until the next Patch Tuesday. During the time after Microsoft releases the patches, the hackers are reverse engineering the fixes and figuring out where the vulnerabilities are and creating corresponding exploits and then launching those.

Furthermore, Microsoft ships out many binary updates, e.g., to Windows, which can be installed, usually requiring a reboot of the Windows workstation.

SUMMARY

Accordingly, one or more embodiments provide a computer system. The computer system includes an i/o interface operable to transmit and receive communications over at least a portion of a communication network; and a processor. The processor is configured to facilitate: obtaining a fingerprint that indicates classes that comprise the application; and referring to the classes indicated in the fingerprint, looking up whether any of the classes that comprise the application is a broken class. For each of the classes in the application which is determined to be the broken class: the embodiment can substitute a fixed class for the broken class, when the broken class is loaded at class load time for the application; or substitute a fixed class method into the broken class, when the broken class is loaded at class load time for the application; or substitute fixed byte code For broken byte code corresponding to the broken class, when the broken class is loaded at class load time for the application; or unload the broken class and then loading the fixed class in place of the broken class, when the application is running; or replace the broken class inside the static application with the fixed class, without replacing classes which are not broken, when the application is not running According to another embodiment, the fingerprint for the application is obtained from a class path of the application.

According to yet another embodiment, the fingerprint for the application is obtained on a just-in-time basis at class load time.

Yet another embodiment includes scanning, at run time with a byte code interpreting virtual machine running the application, the classes before they are being loaded to determine the classes that comprise the application.

Still another embodiment includes inserting an agent that performs the scanning into the byte code interpreting virtual machine before the classes begin loading.

In a further embodiment, the application is run in a context of a byte code interpreting virtual machine.

In an embodiment, the fixed classes to be substituted for the broken classes are served from a database.

In another embodiment, the fingerprint for the application is obtained based on a scan of the application external to a virtual machine on which the application is configured to be executed.

A further embodiment is a computer-implemented method for correcting a portion of an application, according to one or more of the above embodiments.

Still another embodiment is a non-transitory computer-readable medium comprising instructions for execution by a computer, the instructions including a computer-implemented method for correcting a portion of an application, the instructions for implementing the method in a processor.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF' THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

Figure 1:
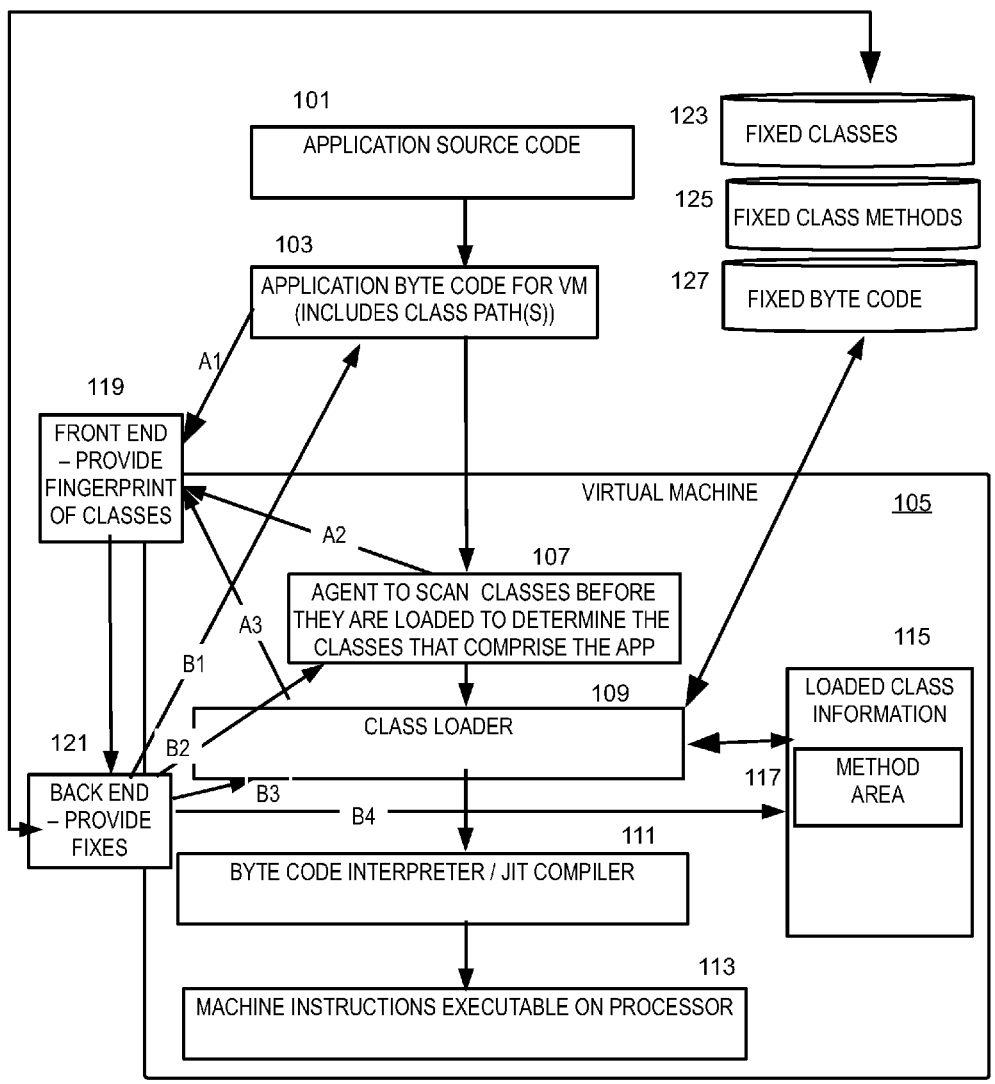
FIG. 1 is a data flow diagram illustrating a summary of several embodiments for providing a correction to an application.

In overview, the present disclosure concerns software development, in which an application comprises different self-contained components, such as classes, which can be loaded into a virtual machine which then runs the application. One of the self-contained components of the software is discovered to be "broken," that is, to need an update for any of various reasons, such as to correct an error, to correct a vulnerability, to provide a minor improvement, or similar can be updated so that the un-updated piece of software needs to be replaced; a "fixed" component is provided which has the correction. Even though the broken component of the software needs to be replaced, it is not necessary to replace the other, non-broken components of the software. More particularly, various inventive concepts and principles are embodied in systems, devices, and methods therein for replacing broken classes in the software application with fixed classes, or doing the same for a pre-defined portion of the class, without replacing the non-broken classes in the application, in the byte code of the application or even while the application is fully executing.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

<Definitions>

The claims may use the following terms which are defined to have the following meanings for the purpose of the claims herein. Other definitions may be specified in this document.

The term "byte code" as used herein is defined to mean an intermediate operational code which was generated by translating an input programming language, and then the byte code can be interpreted at the time the byte code is executed by the virtual machine which has its own instruction set independent of the native machine code for the hardware on which the virtual machine executes. Examples of computer languages which use "byte code" include, without limitation, Java, .NET, Scala, groovy, and Pascal The term "byte code interpreting virtual machine" is defined to mean a virtual machine that has its own instruction set (called herein a "byte code") which is independent of the native machine code for the hardware on which the byte code interpreting virtual machine executes; the byte code interpreting virtual machine inputs byte code from an application which is executed, interprets the byte code to generate native machine code for the processor on which the virtual machine executes, and then causes the processor to execute the native machine code. On some virtual machines, the byte code can be compiled to native machine code (in Java, this is Just-In-Time—or JIT—compilation).

The term "class" is used herein to indicate a re-usable piece of code which is self-contained, has a predetermined framework, and in its compiled form is used to construct an application. For Java, the term "class" can be further defined in accordance with Java specifications.

The term "component" used herein is defined to be a specific version of pre-existing executable software, or a reusable pre-existing self-contained software code building block which is not a complete stand-alone finished product ready for use and which is binary or source code. A component is the subject of a license or a target of a security vulnerability. Less formally, a component which is part of a stand-alone product can be understood to be a self-contained bit of code which a developer does not wish to write himself/herself as part of the stand-alone product, and so the developer uses a previously existing component for which the functionality likely was previously vetted as a part of another stand-alone product, The term "computer system" or "computer" used herein denotes a device sometimes referred to as a computer, laptop, personal computer, personal digital assistant, notebook computer, personal assignment pad, server, client, mainframe computer, or evolutions and equivalents thereof.

"Open source" software is defined herein to be source code that allows distribution as source code as well as compiled form, with a well-publicized and indexed means of obtaining the source, optionally with a license that allows modifications and derived works.

The term "Open Source Definition" is used herein to mean the Open Source Definition available from the Open Source Initiative, variations and evolutions thereof.

The term "repository" or "software repository" used herein are defined to mean an electronic storage system that stores software build components (sometimes refined to as an "artifact") and dependencies for later retrieval, to which artifacts are published in accordance with procedures which are well known to those in the field, so that artifacts made by one software developer are published to be available for further use by other software developers, to be incorporated as building blocks to build software products which can be executed; a repository can include a computer server by which the stored electronic copies of artifacts are made available for use by software developers to be incorporated as building blocks to build software products which can be executed; the repository typically has a unique identifier that indicates the software developer (an individual or a group) that contributed the artifiict. A repository can be remote or local.

The term "software build" used herein specifically is defined to mean a process as pre-defined in an executable build program of converting a plurality of components (sometimes obtained from a repository) and combining the results into an executable stand-alone computer program or a software component for use in a further software build, including at least compiling components and linking compiled components and possibly binary components (which can be from the repository), in a pre-determined order as defined in the build program.

The term "compiler" is used herein specifically to mean a computer program(s) that transforms source code written in a programming language into a target language that is readable by a computer, often in the form of binary code or bytecode, so as to create an executable program.

<End of Definitions>

In overview, one or more embodiments can directly patch running applications, which (among other things) can eliminate the window of threat or vulnerability that exists today.

As further discussed herein below, various inventive principles and combinations thereof are advantageously employed to short circuit elements of updating applications. In a running application, the goal herein is the ability to replace the smallest portion possible that has a problem with a corrected version. As is known in the software developer community, updates or patches can be provided for classes; the class with the update or patch that supersedes a class is referred to as a "fixed" class and the class which is superseded is referred to as a "broken" class. The system can take the broken class or perhaps the class method or even the byte code level of the broken class, and substitute the fixed class, class method, or byte code for or into the broken class.

Further in accordance with exemplary embodiments, there is provided a method and system that resolve the issues mentioned above relatively quickly. Users can consume from a data service which indicates how to patch things, and/or the patch can flow directly into the application even if the application is running.

Today, in the Java ecosystem, there is no systematic way to notify developers of problems and patches. U.S. application Ser. No. 13/231,162, filed 13 Sep. 2011, titled "Method and system for monitoring a software artifact", can provide a sophisticated solution to the problem of notification and monitoring. The system discussed herein can make it possible for someone which received such notification to directly patch the application on the operation side without having to go back through development. This can be especially helpful when there is no longer a development team in place to support the application. Needing to patch a vulnerability when there is no development team to track the problem, compile the source, or the like can be particularly troublesome. However, one or more of the embodiments discussed here can solve the problem by, e.g., swapping out some, but not all, of binary files that are used to run the application.

The Microsoft Tuesday discussed above is a brute force approach and avoids a light touch of just updating what needs to be updated. Also, Microsoft simply pushes out patches for their own software (which is very conventional) already incorporated a new version of the application as a whole. By comparison, the system described herein can be used to surgically patch some third party's software which is incorporated into in an application, without a developer revising or even looking at the source code.

Furthermore, in comparison to brute force insertion of a patch at a physical location, this system can solve multiple problems in a non-intrusive way. For example, the inventors observed that it may not be necessary to swap an entire JAR file to solve multiple problems. However, it is not easy for a developer to take somebody else's patch and apply it to third-party open source code which is not code that the developer wrote. Also, conventionally the application with the fix would need to be run through tests and the like before releasing the application with the fix. In comparison, the system and method herein can provide a way to get the patch loaded into the run time in a way in which it is easy to use and is not going to break other code.

As further discussed herein, one can consume these patches at various points within the development process and operational process. On the one extreme, the production systems that are actively running can consume a live data feed and in real time patch a running application. The system can unload the affected classes, load the patched versions and the application continues to run on the virtual machine, maintaining all the space/states that are there in the virtual machine. On the other extreme, the same data feed can be incorporated at the development tooling level, such as the IDE, which can be alerted that there is a vulnerable component and there is an update available; the update can show the difference in source, class method change, etc. The system can push the patch in the data feed through as an update, which can be pushed through as a release, etc. Optionally, an embodiment can be wrapped around secured data services that communicate the information as to how to apply the fixes to the problematic areas of the application.

When the system patches a running application, the application already has the broken class loaded into the memory. So the classes that need to be fixed may need to be unloaded.

One approach is to run a scan of the application and get the list of vulnerable items. From the list of vulnerable items in the application, the recipe for fixing broken items in the application can be developed. From there, an embodiment of the system can assemble the patched classes into an artifact that contains the patched classes. The artifact that contains the patched classes may not necessary be a JAR file. The system can load only the classes that need to be patched.

As an example of another approach, the system running the application can be taken down. Then the scan can be run to fingerprint (that is, to identify, what is broken) the application. (This approach is intermediate between patching a running application, and someone working in an IDE.) The fixed classes to be patched are assembled into an artifact that contains the patched classes. Then, a tool is able to replace the broken classes with the fixed classes, dynamically. This can be a more fine grained approach than using a JAR of the classes.

Yet another approach is to take an analysis of the contents of an application, produce a very specific antidote which is custom tailored to the things the application is infected with, and deliver the antidote to the application in a streamlined way. This is the up-front analysis mode. This can provide a one-time atomic patch update.

A different approach may be taken instead of trying to analyze the application (which can be problematic because all of the JARs composing that application might not be known). This approach can deconstruct how the applications are loaded. An agent can be installed, for example, to monitor class loading activities, and to calculate byte code hashes on the class that is actually loaded, thus providing a signature of the classes. Updates for classes can be requested from a feed. This can use run-time monitoring of classes as they are loaded into the virtual machine. This can use a precise knowledge of what is actually loaded, and furthermore can allow the patch at the point in time that the class is being loaded. If a class is loaded later, it can be patched at that point in time.

As another approach, during runtime, the system can identify the entire class path which is conventionally available at runtime, and all of the artifacts, in their entirety; instead of waiting for the classes to be loaded. The application can later manipulate the class path, and/or the class path can be pulled in at a later point. The term "class path" as used herein is intended to be as understood to one of skill in the arts of software classes, virtual machine arts or Java instead of as interpreted by a more general dictionary. In short, the system can be monitoring what is actually used during runtime, and pulling the fixed patches on an as-needed basis. This can provide a monitoring mode.

Referring now to FIG. 1, a data flow diagram illustrating a summary of several embodiments for providing a correction to an application will be discussed and described. FIG. 1 illustrates an application source code 101 (for example, human-readable programming code, e.g., Java source code), an application byte code 103 for virtual machine (for example, byte code which is executable on the virtual machine, and a virtual machine 105. The application source code 101 is at least preliminarily compiled in accordance with conventional techniques to form the application byte code 103. The application byte code 103 can include class paths as is well understood to one of skill in the art. The application byte code 103 is representative of any number of self-contained application byte codes, which are typically stored as separate files, all in accordance with conventional techniques. In a conventional system, the application byte code 103 is passed to the virtual machine 105 for execution. The virtual machine 105 includes a class loader 109 which can load classes called for by the application byte code. The classes may be loaded when they are called but not before. Then, as is known, the byte code is passed to the byte code interpreter and/or just in time (JIT) compiler 111 within the virtual machine, according to known techniques. The interpreted/compiled code is machine instructions executable on a processor 113 on which the virtual machine 105 is running FIG. 1 also illustrates a front end 119 that provides a fingerprint of the classes that comprise the application, and a back end 121 that provides fixes (if any) to one or more of the classes that comprise the application. At the front end 119, the classes are checked and a fingerprint/recipe is developed for how to fix any broken classes, for example, for third-party components in an application. At the back end 121, the patches are applied. No conventional technique is known to apply fixes to run time applications and apply security patches for third-party components. This system is looking for bugs in the software which need to be fixed, and then fixing them in real time. This system is not necessarily limited to looking for a maliciously hidden piece of code, but can be looking for a piece of code that is just broken. One or more embodiments is intended to directly fix up the executable.

The front end 119 can obtain the fingerprint in different ways, here exemplified as fingerprint sources A1, A2, A3. As a first fingerprint source A1, the front end 119 can scan the application byte code 103, for example, to review class paths, which indicate the classes. Class paths and how they are structured in application byte code is known and weft-defined. As a second fingerprint source A2, an agent 107 can be installed to scan classes before they are loaded to determine the classes that comprise the application; the front end 119 can obtain an indication of the classes that comprise the application from the agent 107; the classes can be intercepted before they are loaded by examining which classes are called for loading. As a third fingerprint source A3, the front end 119 can obtain an indication of the classes that are being loaded or that have been loaded, from the class loader 109. Although not illustrated, the front end 119 can obtain an indication of the classes that have been loaded from loaded class information 115. The loaded class information 115 is conventional for the virtual machine 105. The loaded class information 115 includes a class method area 117 as is known, which stores information regarding classes methods. Also not illustrated is that the front end 119 can obtain an indication of the classes from the application source code 101. Each of these sources for the fingerprint has its own advantages or disadvantages. For example, some classes refer to other classes which themselves refer to other classes; this can be difficult to determine merely from the application source code 101 or application byte code 103 alone and consequently a fingerprint developed solely from those fingerprint sources might be incomplete though still better than nothing.

The back end 121 receives the fingerprint that indicates the classes which comprise the application, or the broken classes in the application. The broken classes can be determined at the front end 119 or back end 121. A class can be determined to be broken, for example, by receiving information indicating that one of the classes has been superseded by a class, class method or fixed byte code in a database of fixed classes 123, fixed class methods 125 and/or fixed byte code 127. The backend 121 can obtain the fixed class 123, fixed class method 125, or fixed byte 127 which can include an indication of how to apply the fix. A broken class can be fixed by being replaced in its entirety with a fixed class, by replacing one or more class methods in the broken class with a fixed class method, or by replaced pre-defined byte code within the class with fixed byte code. Then, the back end 121 can apply the fix, here exemplified as modes B1, B2, B3 and B4. A first mode B1 to fix a class which is broken is by replacing the class, class method or byte code within the original application byte code 103 before passing to the virtual machine. A second mode B2 to fix a class which is broken is for the agent 107 to intercept the class before it is passed to the class loader 109, and to replace the intercepted broken class with the fixed class, class method or fixed byte code. A third mode B3 is to unload a broken class via the class loader 109, and to load the fixed class instead. A fourth mode B4 is to replace the class information, class method information, or byte code within the loaded class information 115 or the method area 117.

The back end 121 can provide the patches, or extracts the patches, to provide the fix. At the back end, what needs to be fixed is known and the fixed classes, class methods and/or byte code 123, 125, 127 have been retrieved from the database. (The system can provide a database with the patches, or the patches can be extracted from the artifact that has been already fixed. The database of fixed classes, fixed class method and fixed byte code 123, 125, 127 can be manually prepared, to provide the set of fixes for a broken class.) Whenever there is a request for a broken class, the system can instead serve up the fixed class (retrieved from the database of patched classes).

A database can be provided that stores the actual fixed class 123, class methods 125 or byte code 127. The back end 121 can be given the fingerprint/list of things that need to be fixed for the application. The fixed versions are retrieved from the storage 123, 125, 127. In the static version, the fixes are sent to the system that needs the fixes. In another version, the system inserts itself into the class loading hierarchy, so that anytime a class is attempted to be loaded, the system can determine whether it needs to serve up a different (fixed) version than is requested to be loaded. In this regard, not that there is a conventional API in Java that allows the system to be inserted, and/or to serve up a different class than was requested. For example, the system can be the first thing to start before the classes are loaded, which allows the system to know what is being loaded so as to substitute fixed classes for broken classes. The system knows where to go to find the fixed classes.

It will be appreciated that the fingerprint(s) may be obtained for the application by the front end 119 and then can be stored as corresponding to the application. The back end 121 can later use the stored fingerprint that corresponds to the application so as to provide the fix. For example, the front end 119 can obtain the fingerprint via, e.g., the class loader 109; the back end 121 can later provide the fixes to, e.g., the application byte code 103 or via the intercept agent 107 the next time the application is run.

It will also be appreciated that the front end 119 and back end 121 can be run asynchronously or in a loop, for example, so as to apply fixes on an as-needed basis. For example, the front end 119 can determine that a first class that is loaded is broken and the back end 121 can immediately unload the broken class and load the fixed class instead; meanwhile the front end 119 can be working on a next class.

Furthermore, consider an environment with several applications, for example, with a 1 to N configuration. After the first application is patched, a local cache of fixed classes and needed information can be shared amongst the several running applications.

Figure 2:
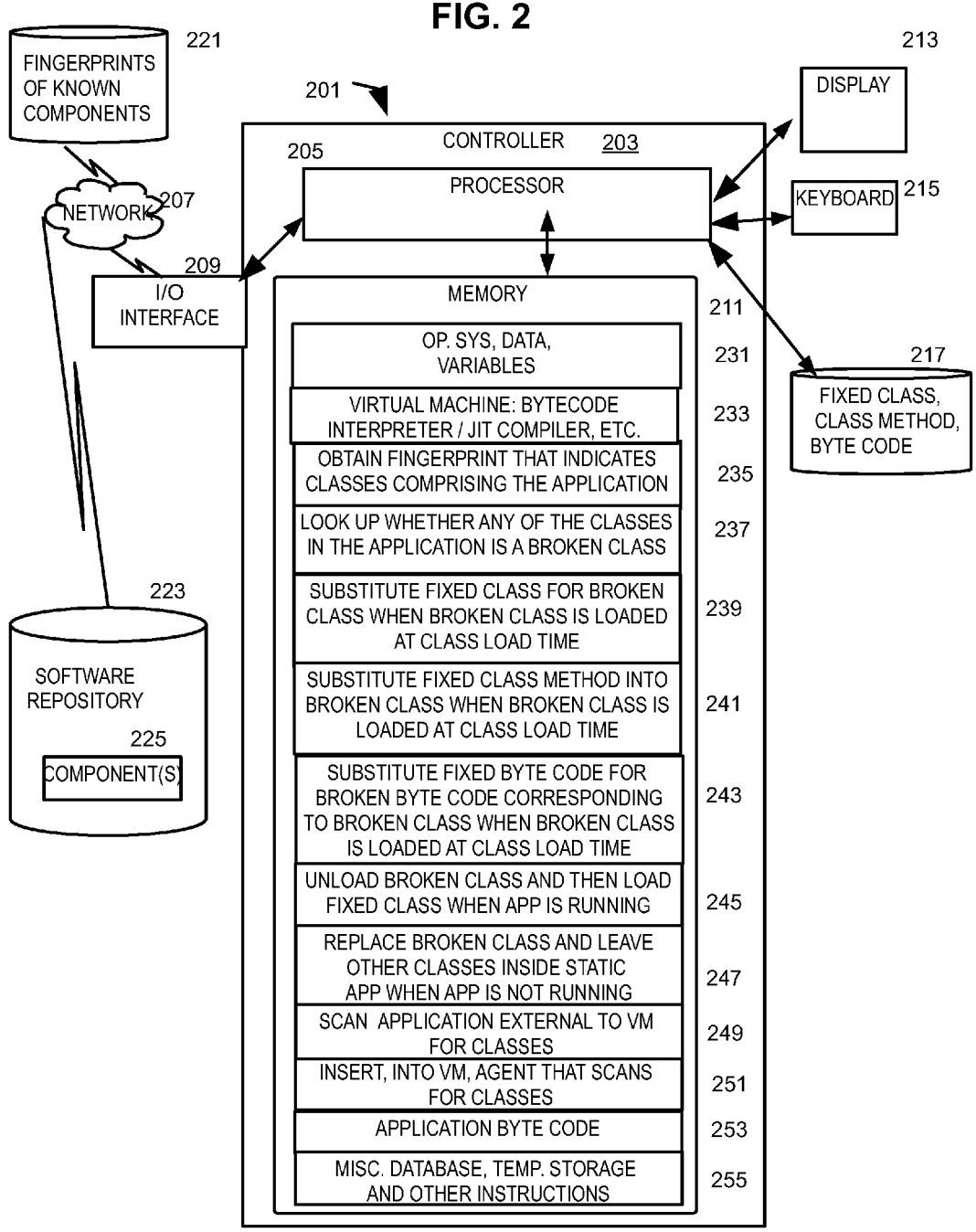
FIG. 2 is a block diagram illustrating relevant portions of a computer system.

Referring now to FIG. 2, a block diagram illustrating relevant portions of a computer system wilt be discussed and described, a diagram illustrating relevant portions of a computer system will be discussed and described. The computer 201 may include one or more controllers 203, a processor 205, an input/output (i/o) interface 209 for communication such as with a network 207, a memory 211, a display 213 (optional), and/or a user input device such as a keyboard 215. Alternatively, or in addition to the keyboard 215, a user input device may comprise one or more of various known input devices, such as a keypad, a computer mouse, a touchpad, a touch screen, a trackball, and/or a keyboard. The display 213 may present information to the user by way of a conventional liquid crystal display (LCD) or other visual display, and/or by way of a conventional audible device (e.g., a speaker) for playing out audible messages. Portions of the computer 201 are well understood to those of skill in this area and have been omitted to avoid obscuring the discussion.

The processor 205 may comprise one or more microprocessors and/or one or more digital signal processors. The memory 211 may be coupled to the processor 205 and may comprise a read-only memory (ROM), a random-access memory (RAM), a programmable ROM (PROM), and/or an electrically erasable read-only memory (EEPROM). The memory 211 may include multiple memory locations for storing, among other things, an operating system, data and variables 231 for programs executed by the processor 205; a virtual machine 233 including byte code interpreter/JIT compiler, and the like; computer programs for causing the processor to operate in connection with various functions such as to obtain 235 a fingerprint for the application, look up 237 whether any of the classes in the application is broken; substitute 239 a fixed class for the broken class, substitute 241 a fixed class method into the broken class when the broken class is loaded, substitute 243 fixed byte code for broken byte code corresponding to the broken class, unload 245 the broken class and then load the fixed class when the application si running, replace 247 the broken class and leave other classes intact inside a static application when the application is not running, scan 249 the application external to the virtual machine for classes, and insert 251 into the virtual machine an agent that scans for classes; application byte code 253; and a database 255 for other information and/or instructions used by the processor 205. The computer programs may be stored, for example, in ROM or PROM and may direct the processor 205 in controlling the operation of the computer 201. Each of these functions is considered in more detail herein, to the extent that it is not detailed elsewhere in this document.

The user may invoke functions accessible through the user input device such as the keyboard 215. The user input device may comprise one or more of various known input devices, such as a keyboard (215, illustrated) and/or a pointing device, such as a mouse; the keyboard 215 may be supplemented or replaced with a scanner, card reader, or other data input device; and the pointing device may be a mouse, touch pad control device, track ball device, or any other type of pointing device.

The display 213 is representative of a display that may present information to the user by way of a conventional liquid crystal display (LCD) or other visual display, and/or by way of a conventional audible device for playing out audible messages.

Responsive to manual signaling from the user input device represented by the keyboard 215, in accordance with instructions stored in memory 211, and/or automatically upon receipt of certain information via the i/o interface 209, the processor 205 may direct the execution of the stored programs.

The computer 201 can access a software repository 223 on which is stored one or more components, here represented by component(s) 225, which is representative of one or more masters for preparing the library 221 of fingerprints of known components. Although the components 225 are illustrated as accessed over the network 207, the components 225 may be remotely and/or locally accessible from the computer 201, over a wired and/or wireless connection; the components 225 do not need to be limited to a database or a software repository 223. Techniques are known for accessing components located in a software repository 223, and the like.

The processor 205 may be programmed with a virtual machine 233 including byte code interpreter/JIT compiler, and the like. A Java virtual machine is an example virtual machine, which runs the application by (among other things) receiving and interpreting byte code 253 into machine language code which is appropriate for the operating system 231 and computer 201. The Java virtual machine in effect runs the application code. The Java virtual machine provides more nuances than executing machine language code, and supports dynamic redirection capability. The actual memory locations can be supported directly by the Java platform. Other virtual machines are also known.

The processor 205 may be programmed to obtain 235 a fingerprint that indicates the classes comprising the application. The processor 205 can be programmed to monitor the class loading activity on the fly, or statically checking the class path, to feed into the fingerprinting. The fingerprinting is described, for example, in U.S. patent application Ser. No. 13/476,160, filed 21 May 2012, titled "Method and system for matching unknown software component to known software component". For a static check of the application, the application, e.g., byte code 253 is provided when not running and the classes are discovered. The monitoring can be done from inside the Java virtual machine 233. The class lists can be provided to the fingerprinting module. Techniques are known for taking a piece of executable code and determining what the classes are, whether by running the executable code or just looking at the executable code. For example, the class loader identifies classes by name and the class path format is well-known; this can be a look-up in that path to find that first file; the class path is ordered, and can include named files. The class path can be scanned for the named files. The source code or byte code can be scanned for references to the classes inside the byte code. Alternatively, the JVM conventionally provides some hooks that allow a class lookup to always call something, so that the system can make a decision that a class load request will be passed through or so that a different class will be served up instead (so as to serve up the fixed class instead of the broken class). This allows for both fingerprinting as well as the redirection of the class load.

The processor 205 may be programmed to look up 237 whether any of the classes in the application is broken. The fingerprints can be used to understand what appropriate fixes need to be loaded to resolve any issues in the fingerprinted classes. The output of the fingerprinting can indicate the content of the input application. Then, we do the lookup and figure out what broken classes are in the application. This will then provide a list of what needs to be patched specific to that application. The next step is to fetch the fixes for those things that need to be patched. Now, the system can pull from the new services the patches.

The processor 205 may be programmed to substitute 239 a fixed class for the broken class when the broken class is loaded at class load time. When the virtual machine attempts to load the broken class, the broken class can be intercepted and the fixed class is substituted by replacing the information of the broken class with the information of the fixed class. The fixed class is then loaded in accordance with the usual techniques.

The processor 205 may be programmed to substitute 241 a fixed class method into the broken class when the broken class is loaded at class load time. When the virtual machine 233 attempts to load the broken class, the class being broken due to a broken class method, the broken class can be intercepted and the fixed class method is substituted into the broken class for the broken class method by replacing the information of the broken class method with the information of the fixed class method. Then the class which is now fixed is loaded as usual.

The processor 205 may be programmed to substitute 243 fixed byte code for broken byte code corresponding to the broken class, when the broken class is loaded at class load time. When ate virtual machine 233 attempts to toad the broken class, the class being fixable by patching certain pre-defined byte code, the broken class is intercepted and the pre-defined byte code fix is substituted into the broken class. Then the class with the fixed byte code is loaded as usual.

The processor 205 may be programmed to unload 245 the broken class and then load the fixed class when the application is running. This can be considered asynchronous patching. When a class is loaded, the class which happens to be broken is loaded; meanwhile a background process can be started to fetch the known patch. Then, the broken class is unloaded and the fixed class is loaded (according to known techniques for unloading and loading classes), after the known patch has been successfully fetched. Note, the broken classes for an application might not be known until the second time this system is run (that is, after the fingerprint has been created). The fixed classes can be pre-fetched.

The processor 205 may be programmed to replace 247 the broken class and leave other classes intact inside a static application when the application is not running. This is described below in more detail.

The processor 205 may be programmed to scan 249 the application external to the virtual machine for classes. That is, the application byte code 253 or source code (not illustrated) stored in memory 211 or other storage, can be scanned for classes in accordance with known techniques, prior to attempting to run the application on the virtual machine 233.

The processor 205 may be programmed to insert 251 into the virtual machine 223 an agent that scans for classes. For example, the Java virtual machine context can be running on the computer 201. The processor 205 can create an agent that interacts with the standard conventional class loader. When the application starts up and the VM 233 starts to load classes, the agent can intercept the load requests and scans the information coming through. The system thus can sense that a class is being loaded. The scan can be done right at the time the class load is initiated, so as to determine that the requested class matches a broken class with a known problem (for example, by a comparison of class paths). A storage for fixed class, fixed class method, or fixed byte code 217 is either local (for better performance) or remote (for expanded storage). The agent can then serve up the fixed class instead of the requested class to the virtual machine loader. Note that an embodiment can be provided where the patch functionality discussed herein can execute entirely on the computer 201 that is running the application byte code 253.

The processor 205 may be programmed with application byte code 253. Source code can be turned into application byte code 253 in accordance with known techniques. The virtual machine 233 then interprets the application byte code 253 down to the machine level code. In theory, a virtual machine such as provided by the JVM allows the byte code 253 to be run on any given platform. It will be noted that the present solution concerns rewriting byte code instructions usable by the virtual machine, as opposed to patching bits in machine level code. The byte code is the instructions provided into the JVM. The byte code that can be run on the JVM is what can be fixed.

As will be understood in this field, besides the functions discussed above, the memory 211 can include other miscellaneous information in a misc. database 255, along with the usual temporary storage and other instructions for other programs not considered herein.

The computer 201 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 205, memory 211, a disk drive and/or removable storage medium are referred to as "computer-readable storage media" and provide non-transitory storage of computer programs and data.

It should be understood that FIG. 2 is described in connection with logical groupings of functions or resources. One or more of these logical groupings may be omitted from one or more embodiments, for example, the functionality of looking up 237 whether any of the classes in the application is a broken class, and scanning 249 the application external to the virtual machine can be omitted and/or performed on a different processor. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

Figure 3:
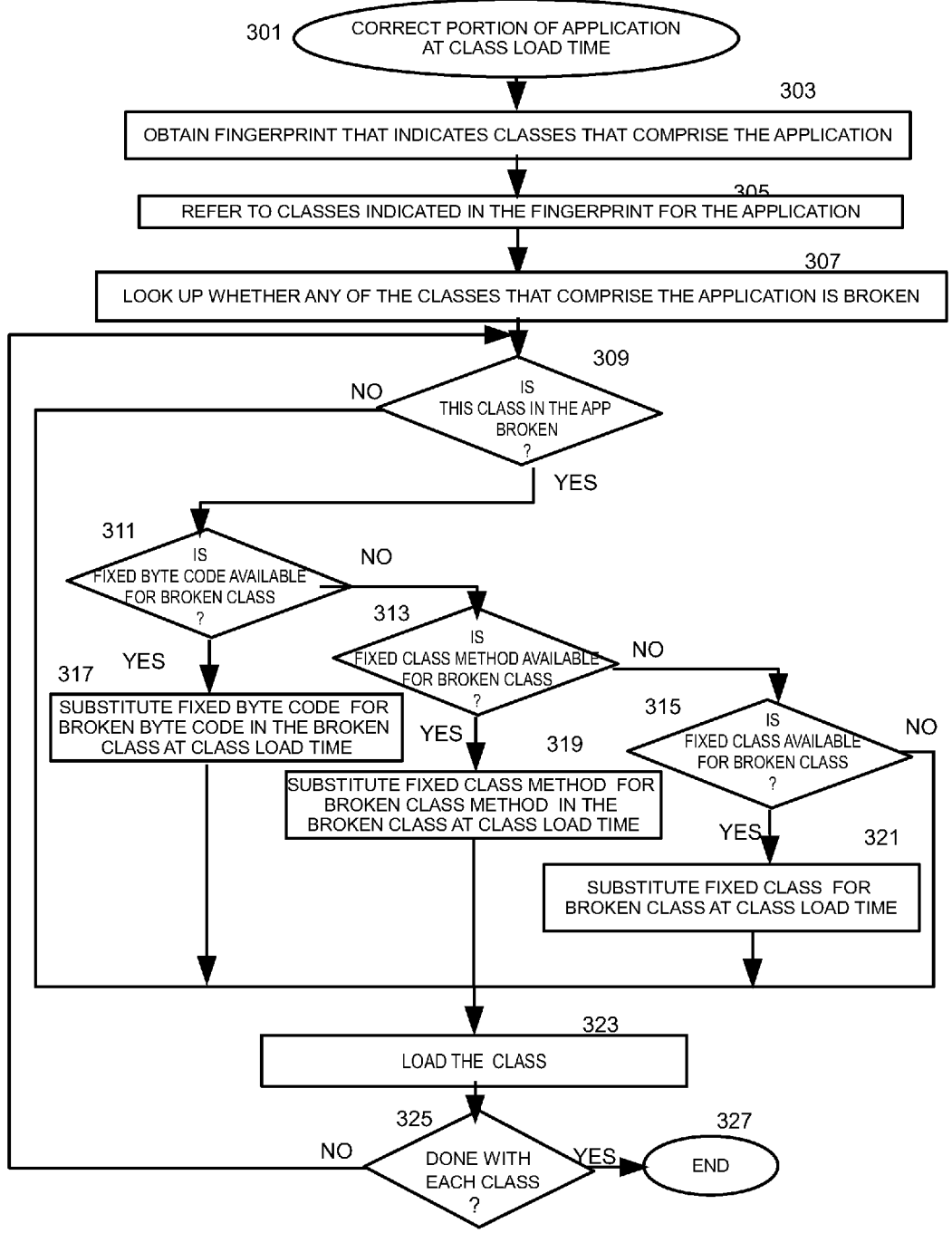
FIG. 3 is a flow chart illustrating a procedure to correct a portion of an application at class load time.
Figure 4:
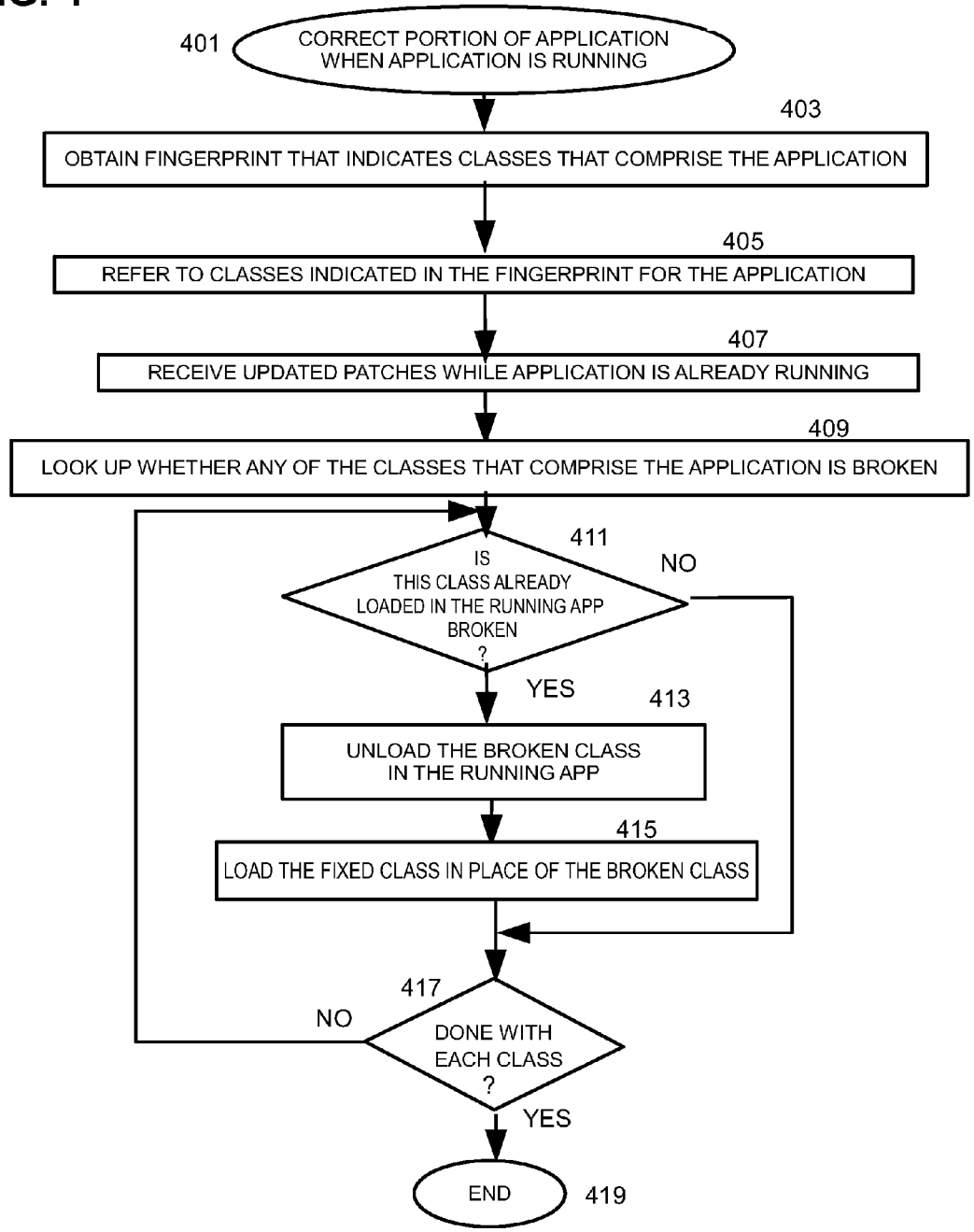
FIG. 4 is a flow chart illustrating a procedure to correct a portion of an application when the application is running.
Figure 5:
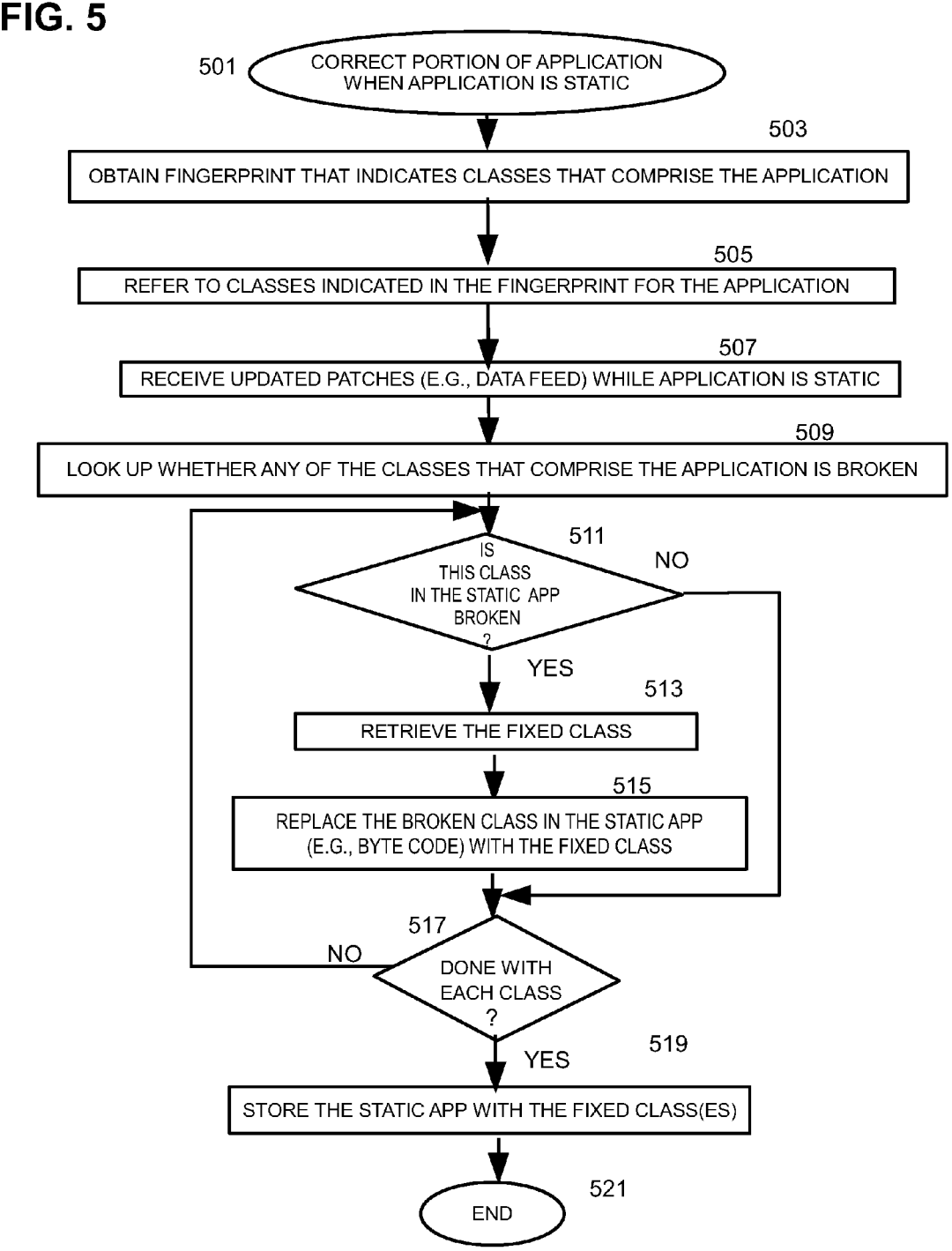
FIG. 5 is a flow chart illustrating a procedure to correct a portion of an application when the application is static.
Figure 6:
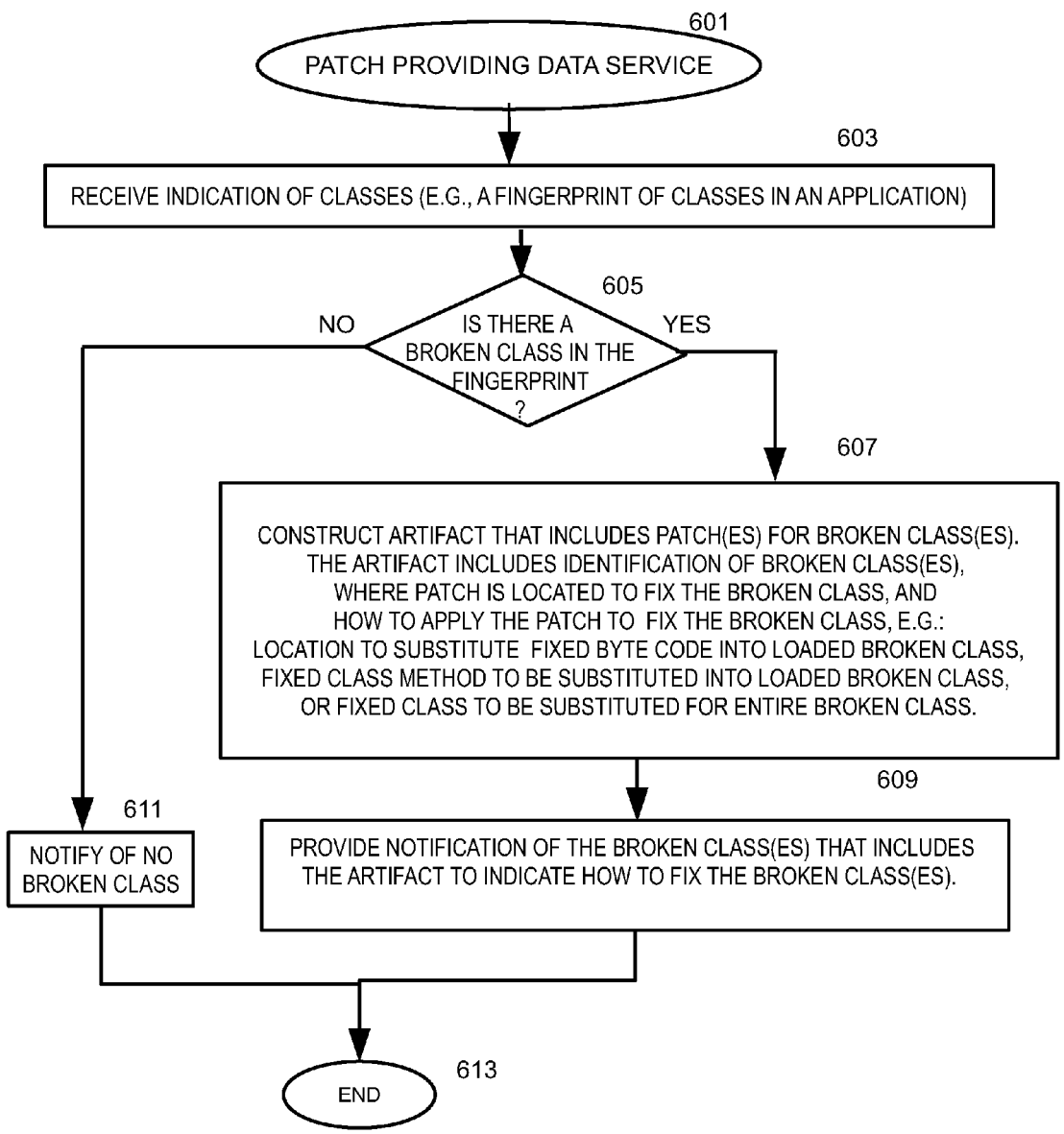
FIG. 6 is a flow chart illustrating a patch providing data services.

FIG. 3 to FIG. 6 are flow charts that illustrate different procedures for patching a broken class in an application when the application is in different situations. FIG. 3 relates to correction of the application at class load time, FIG. 4 relates to correction when the application is running, and FIG. 5 relates to correction of the application when the application is static. FIG. 6 relates to a complementary patch providing data services. Any or all of the illustrated procedures can advantageously be implemented on, for example, a processor of a controller, described in connection with FIG. 2 or other apparatus appropriately arranged.

Referring now to FIG. 3, flow chart illustrating a procedure 301 to correct a portion of an application at class load time will be discussed and described. In this regard, the "portion" of an application which is corrected is one of plural pre-defined self-contained parts which together comprise the application, which are combined by being loaded into the virtual machine in order to run the application. In overview, the procedure 301 to correct a portion of the application at class load time will obtain 303 a fingerprint that indicates classes that comprise the application, refer 305 to classes indicated in the fingerprint for the application, look up 307 whether any of the classes that comprise the application is broken. If 309 this class is broken, will substitute fixed byte code 311, 317, a fixed class method 313, 319, or a fixed class 315, 321; load 323 the class (the unbroken class or the fixed class); and if not done 325 with each class, will check whether the next class is broken 309, etc. When done processing the classes being currently in the application, 325, the process 301 can end 327. Each of these is described in more detail, although some description that is provided elsewhere is not repeated below.

At class load time, the procedure 301 will obtain 303 a fingerprint(s) that indicates classes that comprise the application. A simple fingerprint of a class can be created by using any conventional hashing technique, such as hashing the class path or a pre-defined portion of the class file. A subsequent section includes a detailed discussion of creating a fingerprint of a class in a manner which mitigates differences which are created as a by-product of the usual course of implementing software. The fingerprint(s) of the classes that comprise the application can be obtained from a local or remote storage, when the application was previously fingerprinted and the fingerprint(s) stored.

The procedure 301 can refer 305 to classes indicated in the fingerprint(s) for the application, so as to determine whether any class is broken.

The procedure 301 can look up 307 whether any of the classes that comprise the application is broken. To determine whether any class is broken, the procedure 301 can check whether the class is listed as broken (or whether a fix for the class is listed) in a table, database, or similar, or in response to a query for broken/fixed classes, or the like. In other words, if the fingerprint of the class in the application matches a fingerprint listed as broken, then the class in the application is determined to be broken. A subsequent section includes a detailed discussion of determining whether fingerprints match.

Then, the procedure 301 can handle the broken classes in the application. If 309 a particular class is broken, the procedure 301 can substitute in fixed byte code 311, 317, fixed class method 313, 319, or a fixed class 315, 321. The process 301 can check whether 311 fixed byte code is available for the broken class, whether 313 a fixed class method is available for the broken class, or whether 315 a fixed class is available for the broken class. This can allow the procedure to replace the smallest portion possible of the class. Whether the fixed byte code, fixed class method, or fixed class is available can be determined, for example, by checking a database for the fixed class, etc., by checking a table for the fixed class, etc., by receiving an update such as from a patch providing data service that lists the fixed class, etc. or the like. A preliminary explanation of different ways to patch a broken class wilt be instructive. In Java, as is known, a class is composed of member variables, class methods, and/or inner classes. The process 301 can patch an individual class that is broken at any number of levels, down to byte code level, without affecting non-broken classes in the same application. To patch the byte code 317 within a class method: as the methods are being loaded, the system substitutes pre-determined byte code (or a section of byte code) within the flawed class method of the broken class at the time the method is being loaded. To patch the class method 319: within the class are zero-to-many methods; any of those methods can be replaced individually; in this situation, the methods are loaded except for the flawed method(s), and the fixed method is substituted in. To replace the entire class 321: the fixed class is substituted for the broken class; instead of loading any element for the flawed class, the broken class is entirely discarded and the elements of the fixed class are substituted.

The procedure 301 can load 323 the class in accordance with the usual techniques. At this point, the class is either the original class which is not broken class or the fixed class, If not done 325 with each class, the procedure 301 can check whether the next class is broken 309, and proceed to handle the next class.

When done processing the current classes in the application, 325, the process 301 can end 327. The procedure 301 can be repeated when other classes are subsequently loaded, since it is likely that classes are not all loaded at the same time particularly when a JIT (just in time) virtual machine is used. In Java, all class loading is just-in-time. In just-in-time loading, a class is loaded, and then after it is determined that the loaded class has dependencies on other classes, those other classes are loaded.

Referring now to FIG. 4, a flow chart illustrating a procedure to correct a portion of an application when the application is running in the virtual machine will be discussed and described. In overview, the procedure 401 to correct a portion of the application when the application is already running will obtain 403 a fingerprint that indicates classes that comprise the application, can refer 405 to classes indicated in the fingerprint for the application, can receive 407 updated patches while the application is already running, and can look up 409 whether any of the classes that comprise the application is broken. If 411 this class is already loaded into the running application and is broken, the procedure 401 can unload 411 the broken class in the running application and load 415 the fixed class in place of the broken class. If not done 417 handling each class, the procedure 401 can check whether the next class that is already loaded is broken 411, etc. When done processing the classes currently in the application 417, the process 401 can end 419. Each of these is described in more detail, although some description that was provided above is not repeated below.

The procedure 401 can obtain 403 a fingerprint that indicates classes that comprise the application which is already running in the virtual machine. Various methods to obtain fingerprints are described elsewhere herein in more detail.

The procedure 401 can refer 405 to classes indicated in the fingerprint for the application, so as to determine whether any class in the running application is broken.

In the illustrated procedure 401, updated patches are received 407 while the application is already running such as from a patch providing data services. If updated patches are received while the application is already running, this can provide a means to promptly update broken classes upon receiving the update without waiting for the application to terminate. Alternatively, the updated patches might be received in response to a query regarding the classes indicated in the fingerprint.

The procedure 401 can took up 409 whether any of the classes that comprise the application is broken. Various methods to took up this information are described elsewhere herein in more detail.

Upon determining 411 that this class is both already loaded into the running application and is broken, the procedure 401 can unload 411 the broken class in the running application. The procedure 401 can then obtain and load 415 the fixed class in place of the broken class. Those in the art will be familiar with techniques for unloading and loading classes in a running application.

If not done 417 handling each class in the already-running application, the procedure 401 can check whether the next class that is already loaded is broken 411, and perform the loading and unloading as discussed above.

When done 417 processing the classes currently in the application, the process 401 can end 419. The procedure 401 can be repeated later, for example periodically or after other classes are subsequently loaded.

Referring now to FIG. 5, a flow chart illustrating a procedure to correct a portion of an application when the application is static will be discussed and described. A static application is one that is not running on the virtual machine, for example, an application in byte code or an application in source code. In overview, the procedure 501 to correct a portion of the application when the application is static will obtain 503 a fingerprint that indicates classes that comprise the application, can refer 505 to classes indicated in the fingerprint for the application, can receive 507 updated patches while the application is already running, and can look up 509 whether any of the classes that comprise the application is broken. If 511 this class in the static application is determined to be broken, the procedure 501 can retrieve 513 the fixed class and can then replace 515 the broken class in the static application with the fixed class. If not done 517 handling each class in the static application, the procedure 501 can check whether the next class in the static application is broken 511, etc. When done processing the classes in the static application 517, the process 501 can store the static application with the fixed classes 519 so that the next time the static application is run it will have no broken classes. After storing the static application, the process 501 can end 519. Each of these is described in more detail, although some description that was provided above is not repeated below.

The procedure 501 can obtain 503 a fingerprint that indicates classes that comprise the application which is already running in the virtual machine. Various methods to obtain fingerprints are described elsewhere herein in more detail.

The procedure 501 can refer 505 to classes indicated in the fingerprint for the application, so as to determine whether any class in the static application is broken. This is also described elsewhere Also described elsewhere, updated patches can be received 507 while the application is static such as from a patch providing data services.

The procedure 501 can look up 509 whether any of the classes that comprise the application is broken, as described elsewhere in more detail.

Upon determining 511 that this class in the static application is broken, the procedure 501 can retrieve 513 the fixed class that corresponds to the broken class. The procedure 501 can then replace 515 the broken class in the static application with the fixed class, such as by replacing the byte code of the static application.

If not done 517 handling each class in the already-running application, the procedure 501 can check whether the next class in the static application is broken 511.

When done 517 processing the classes currently in the application, the process 501 can store 519 the repaired static application in which the broken classes have been replaced with fixed classes, and then can end 521. The procedure 501 can be repeated later, for example periodically or for other static applications.

Referring now to FIG. 6, a flow chart illustrating a patch providing data service will be discussed and described. In overview, the patch providing data service 601 can receive 603 a fingerprint(s) with an indication of classes to be evaluated from a requestor, can determine whether 605 there is a broken class indicated in the fingerprint. If there is no broken class in the fingerprint, the data service 601 can notify 611 the requestor that there is no broken class and can then end 613. However, if it is determined that there is a broken class indicated in the fingerprint, the data service 601 can construct 607 an artifact that includes the patch(es) for the broken class(es) indicated in the fingerprint, and can provide 609 notification to the requestor of the broken class(es). Each of these is discussed in more detail below.

The patch providing data service 601 can receive 603 a fingerprint(s) with an indication of classes to be evaluated from a requestor. As a practical matter, each fingerprint uniquely identifies a particular class. The patch providing data service 601 can then determine whether 605 any of the classes indicated in the fingerprint is a broken class, such as by comparing the received fingerprint(s) with tables or listings of known broken fingerprints.

If none of the classes indicated in the fingerprint is determined to be broken, the data service 601 can notify 611 the requestor that there is no broken class and can then end 613.

However, if it is determined that there is one or more of the classes indicated in the fingerprint is broken, the data service 601 can construct 607 an artifact that includes the patch(es) for the broken class(es) indicated in the fingerprint. The artifact which is constructed can include, for example, an identification of the broken class(es), a location of the fixed class which can be retrieved to fix the broken class, and further information as to how to apply the fixed class so as to fix the broken class. For example, the further information can indicate a granularity of the fix: where to substitute fixed byte code into a broken class, a fixed class method to be substituted into a broken class, or a fixed class to be substituted for an entire broken class (whether loaded or not). Also, the further information can indicate whether the fix is to proceed differently for a loaded class, a running application, a static application, or similar.

The patch providing data service 601 can provide 609 notification to the requestor of the broken class(es), as well as providing the requestor with the artifact that indicates how to fix the broken class(es).

The back end 121 can provide the patches, or extracts the patches, to provide the fix. At the back end, what needs to be fixed is known and the fixed classes, class methods and/or byte code 123, 125, 127 have been retrieved from the database. (The system can provide a database with the patches, or the patches can be extracted from the artifact that has been already fixed. The database of fixed classes, fixed class method and fixed byte code 123, 125, 127 can be manually prepared, to provide the set of fixes for a broken class.)

Whenever there is a request for a broken class, the system can instead serve up the fixed class (retrieved from the database of patched classes).

The data flows are illustrated herein by way of example to further understanding of the principles discussed here. Actual implementations can omit one or more portions of the data flows, and/or can include other data flows which are within the scope and spirit of the discussion herein.

Generating Fingerprints

For class files, the system can look at individual members of the class and apply the following approach. The file can be normalized and hashes of individual members inside the file are calculated, and those hashes can be compared to a database of known hashes that were previously collected.

Any hash function technique can be used. Well known hash techniques include SHA-1, MD5, and many others that will map an input data set of variable length and output a small data set, sometimes referred as a hash value, hash code, hash sum, check sum, or hash. The particular hash function is not important as long as the same technique is used to hash the file being evaluated and the known file to which it is compared. The file that is input to the hash function can be normalized so that the input is the same despite differences, some of which are subtle, that are injected as part of the process of developing code.

On a source file, some normalization can be done to omit, e.g., end-of-line characters that may be different (depending on the editor implementation) in the bit file that otherwise would be hashed but do not affect the semantics of the file contents. In a compiled application that is being evaluated, the system is trying to compare two components which have been modified by, e.g., a compiler and trace them back to determine that these two apparently different components likely originated from the same source code.

With regard to compilers, running a compiler at a different time or with a slightly different set of parameters or running a different compiler or a compiler with a different set of parameters, on the same source code, can yield a slightly different set of byte code. Also, the compiled code might include a portion of byte code that is random and essentially different every time the code is compiled. A compiler is obliged to generate exactly the same code for the same input, but even different versions of the same compiler can generate slightly different code for identical input.

Two components can be different while being the same semantically, for example, the same source has been through different compiler versions or the same compiler with different options. That two components are "semantically" the same means that the byte codes, although different, were compiled from exactly the same source or using same compiler or with different options, or different versions of the same compiler, and/or using the same or different build tools. To this point, the mere fact of re-compiling changes an outer archive's hash due to the changed time stamp. One question to be answered in matching fingerprints is whether the two components being compared are different compiles of the same source. The normalizing process is intended to mitigate such differences which are created as a by-product of the usual course of implementing software.

One or more normalization techniques can look for cases where the individual class files and contents themselves are slightly altered, and/or where the bulk of an archive itself is the same with some subtle changes such as when a file was patched or a manifest is added. The system can say with some confidence that these different outer files are the same, when every other component in the respective files is identical.

The normalization process which is performed can be dependent on the detected content of the file. For example, to normalize text files, the system can remove the white space, line endings, etc. For Java files, a number of specialized things can be done to normalize the bytecode. The system can normalize other types of components, e.g., .net components. The approach can be similar, i.e., to ascertain and remove information added by the .NET compilers to the semantically functional parts of the code.

A variation is to compile known source code to provide compiled source code, and then compare the resulting output of the known compiled source code to the unknown compiled component.

The system can determine which kind of normalization to do based on the file type (e.g., the file extension as confirmed by the file contents) of the subcomponent. In normalization, a first step is identifying the type of file and a next step can be to normalize the file. The system knows what types of components represent archives. If a component is determined to be an archive, then it contains other components; the component that is an archive is opened up and the process is performed on the components contained in the archive. If the component is a Java class file, a bytecode normalization for Java or for a Java class file is applied. If the component is a text file, the system performs a text file normalization. The system walks down the tree until it has files which are not archive files and then the system handles the individual files. An "Archive file" is defined herein as a file type that is known to contain other files. Examples of an "Archive file" are a zip file, a JAR file, and the like.

One or more normalization processes can be used on a component, to generate respective one or more hashes for a single component.

The normalization procedure for the Java component can generate a universal fingerprint for a Java component. By "universal", it is intended to indicate that any data introduced into the Java component by software programmers while the semantic function is retained, have been reduced by the normalization process, so that two Java components with the same provenance will match, regardless of subsequent compiles, packaging, etc.

Thus, one or more embodiments provides, for a Java component, normalizing the Java component according to a Java normalization process to provide a normalized Java component; and generating, in a processor, the fingerprint for the normalized Java component, as a universal fingerprint in this embodiment, the fingerprint is a hash value; and the Java normalization process performs the following on the Java component: setting class version to 0, resetting synthetic class access flags, setting outer class name to null, setting constant pool and inner class list in alphabetical order, resetting final access flag of Java enumerations #values method, removing all synthetic member fields and Java methods, and removing all package names.

A hash function can performed on each normalized component, including the file to be evaluated as a whole, each component within the file to be evaluated, each component within one of the components, and so on (each, a "subcomponent"). The hash function can generate fingerprints.

Thus, one or more embodiments provides, for a Java component such as a class, normalizing the Java component according to a Java normalization process to provide a normalized Java component; and generating, in the processor, the fingerprint for the normalized Java component, as a universal fingerprint.

Matching Fingerprints

The system can check whether there is an exact match between fingerprint of any known component (such as a class) and the fingerprint of the unknown, possibly broken component (or subcomponent). Even if the unknown component as a whole has a matching fingerprint, the system can evaluate the interior components of the unknown component for matching fingerprints. There is a small possibility of a false positive match of just the unknown component as a whole, and moreover there may be security implications of the internal component that may not have been noted with respect to, e.g., the executable component package.

A known component can have a provenance because it may have been retrieved from storage, such as a software repository, or other structured storage that associates the component with its license(s), build settings and environment, contributor, and/or which may be able to associate the component with vulnerabilities, security updates and the like. Once the unknown, possibly broken component (or its subcomponents) is matched to a known component, the unknown component can be associated with the provenance of the known component (and its subcomponents) and hence the issues related to provenance (e.g., broken/fixed, security, etc.) can be addressed in the unknown component.

Even if there is a perfect match at the outer file level, there may be matches at the subelement which are relevant as well (e.g., archive or class file, etc.). So, fingerprints can be generated and matches can be determined for the unknown component at all of these levels (innermost file subelements, all file sub-elements, and the unknown component overall).

Any known or to-be-developed techniques can be used for comparing hash values and attempting to locate a matching hashed value.

Software Repository

Figure 7:
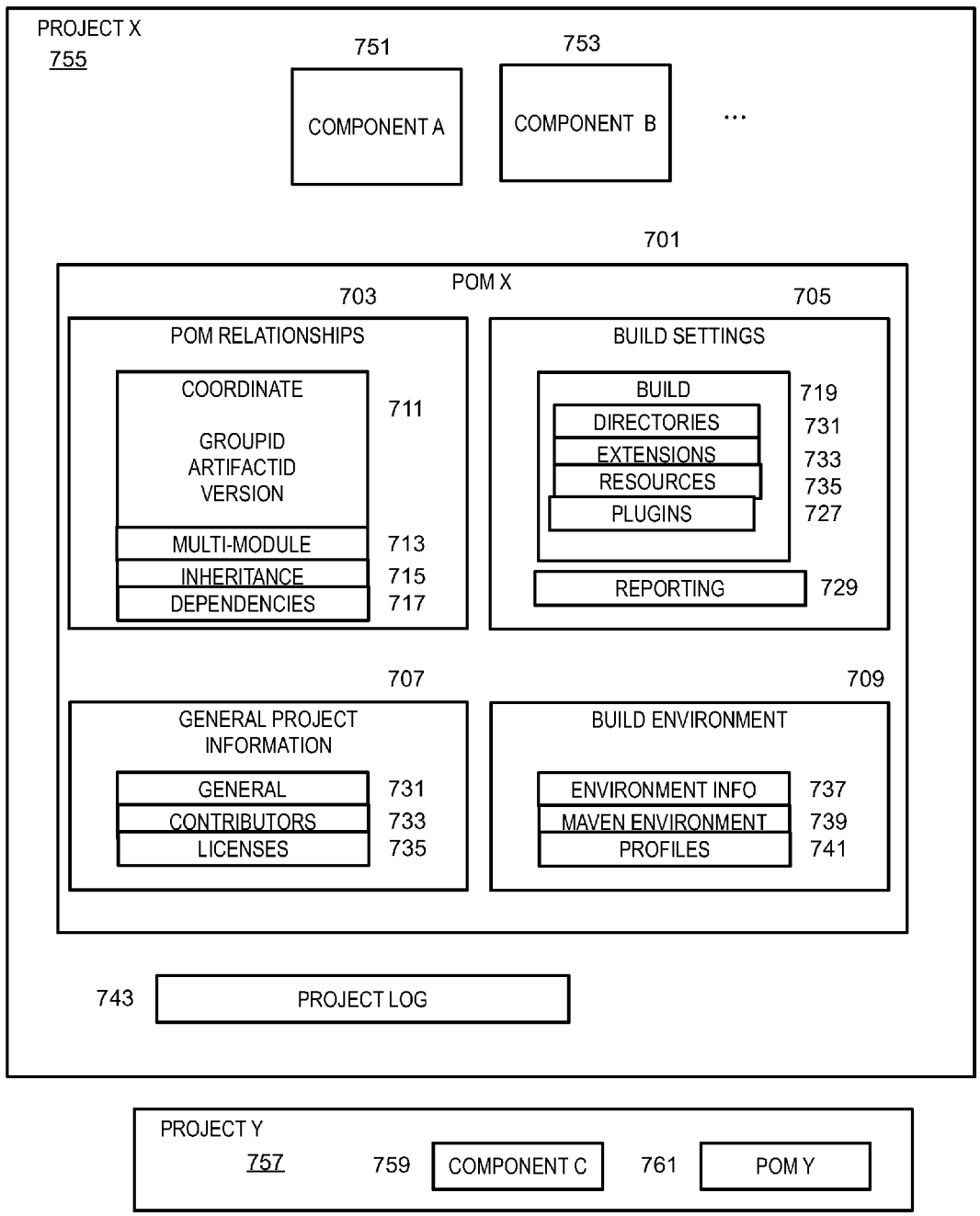
FIG. 7 is a block diagram illustrating a software repository.

Referring now to FIG. 7, a block diagram illustrating a software repository will be discussed and described. FIG. 7 discloses a project object model ("POM"). The project, e.g., project X 755 includes one or more components (here represented by Components A and B 751, 753), the project log 743 for Project X, and metadata for the project X (here represented by POM X 701) that identifies project information such as contributors 733 and licenses 735. The illustrated example is a known Maven software project object model, which provides a highly structured handling of projects and components, sometimes referred to therein as "artifacts". Maven is a build management tool that comprises a project object model ("POM"), a set of standards, a project lifecycle, a dependency management system, and logic for executing plugin goals at defined phases in a lifecycle.

A "Project Object Model" (POM), POM X 701 is a file provided for a project 755 that describes, configures and customizes an application and is associated with one or more components by being included in the same directory as one or more components. In different build tools or project management tools, the POM 701 is a file included in a project, e.g., project X 755, which includes one or more components (represented by component A and component B 751, 753); the POM can be a file with a pre-determined name: a Maven pom.xml file, a GNU Makefile, or an Ant build.xml file. The POM file is typically targeted to Java applications, building JAR components, C# sources, or the like. A software component can be associated with a POM in alternative ways, for example, by including a link or identification of the associated POM.

The POM 701 can contain description data and configuration data: POM relationships 703, build setting 705, general project information 707, and build environment 709. General project information 707 includes general data 431 (project's name, the URL for a project, the sponsoring organization), a list of developers and contributors 733, and/or the license (or identifiers of licenses) for the project 755, The build settings 705 for the project 755 can customize the behavior of a build 719 by specifying location of directories 721, extensions 723, resources 725 and plugins 727. Also, the build settings 705 can specify reporting 729 to be used for the POM 701.

The build environment 709 can include settings and profiles that can be activated when the software comprising the components 751 is built for use in different environments. For example, during development the built software is deployed to a development server, whereas in production developers the built software is deployed to a production server. This example provides build environment information 737, Maven environment information 739, and profiles 741 to be used in different builds. Techniques for executing a build of software are known.

The POM relationships 703 include POM coordinates 411 that specify a group ID, an artifact ID, and a version number for the project 755 and for the POM 701. In the conventional Maven system, group ID, artifact ID and version (GAV) uniquely identify each component. The group ID is meant to identify the individual or organization that published the component. The artifact ID uniquely identities a component for the Group, and in accordance with known techniques indicates what functionality the component is addressed to; artifact IDs need not be unique for different groups. The version is the temporal axis for how a component changes in accordance with known techniques, e.g., Version 1.0 is least mature, and Version 8.2.3 is more mature. Collectively, the group ID, artifact ID and version number are sometimes referred to herein as the "GAV", "Maven coordinate" or "GAV coordinate". The GAV uniquely identifies a component and allows its dependencies and relationship to other components to be tracked. The use of the GAV disambiguates amongst components across various domains of different groups.

The POM as used in Maven is discussed in "MAVEN: The Complete Reference Guide", Edition 8 (2010), In a well-written POM, there is a block for "description," "project", "URL", "License", "Issue tracking", "author list" and the like. Known techniques can be used to construct a POM.

A project, e.g., project X 755 can have a parent, e.g., project Y 757. Project Y 757 is illustrated to include representative component C 759 and a POM 761. Values which are not specified in the POM in a child project can inherit values from the POM of a parent project, e.g., when general project information 707 is not specified in the POM X 701 of Project X 455, the project X 755 can inherit the general project information specified in the POM Y 761 of the parent project Y 757.

Also included in a project 755 is a project log 743. The project log 443 can perform known functions, such as recording source code check-in, check-out, update of a component, download of a component from the project, bugs and related fixes, and similar.

A different project, e.g., project Y 757 includes other components (here represented by Component C 759), the project log (not illustrated) for Project Y, and metadata for the project Y (here represented by POM Y 761) that identifies project information such as contributors and licenses.

It is not necessary to use a POM structure according to Maven; alternative implementations of a software repository as a database which includes components, their associated licenses and/or build information and the like will be understood, For example, in some implementations, a software repository may be very simple, comprising storage of class files, perhaps with an indication whether or not the class is broken and/or an update history.

The detailed descriptions which appear herein may be presented in terms of program procedures executed on a computer or a network of computers. These procedural descriptions and representations herein are the means used by those skilled in the art to most effectively convey the substance of their work to others skilled in the art.

Further, an embodiment has been discussed in certain examples as if it is made available by a provider to a single customer with a single site. An embodiment may be used by numerous users, if preferred, and the users can be at one or more sites.

The system used in connection herewith may rely on the integration of various components including, as appropriate and/or if desired, hardware and software servers, applications software, database engines, server area networks, firewall and SSL security, production back-up systems, and/or applications interface software, A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

The Java computer programming language and the Java virtual machine are sometimes mentioned herein, and in this connection reference may be made to a non-exhaustive list of various specifications for Java Language such as JSR 901 The Java Language Specification, Java SE 7 Edition, The Java Language Specification, Third Edition, The Java Language Specification, Second Edition, The Java Virtual Machine Specification, Java SE 7 Edition, The Java Virtual Machine Specification, Second Edition (JVM), JSR 924, and variations and evolutions thereof. In this regard, it can be noted that various computer programming languages can be used to produce byte code that runs on a Java Virtual Machine include, for example, Java, Groovy, Scala, Kollin, JavaRX Script, JRuby, Jython, Rhino, CLforJava, Flow Java, and/or numerous others.

Terms as used herein are intended to be interpreted as understood to one of skill in the art of software development using Java, virtual machines, and/or software classes, instead of as interpreted by a more general dictionary.

Furthermore, the networks of interest for communicating between computers onto which some embodiments may be distributed include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), NetBIOS (Network Basic input Output System), GPRS (general packet radio service), I-mode and other wireless application protocols, and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for correcting a portion of an application, comprising:
    determining, in a computer, a fingerprint, which is a single fingerprint that indicates plural different classes that collectively comprise the application, the fingerprint being a universal fingerprint from a component normalized to reduce the data introduced by a programmer and to retain a semantic character of component content;
    referring, in the computer, to the plural different classes, indicated in the fingerprint, that collectively comprise the application, and looking up whether any of the plural different classes that comprise the application is a broken class;
    for each of the plural different classes in the application which is determined to be the broken class:
        substituting a fixed class for the broken class, when the broken class is loaded at class load time for the application, or substituting a fixed class method into the broken class, when the broken class is loaded in the computer at class load time for the application, or substituting fixed byte code for broken byte code corresponding to the broken class, when the broken class is loaded in the computer at class load time for the application, or replacing the broken class inside the static application with the fixed class, without replacing classes which are not broken, when the application is not running;

wherein the fingerprint for the application is obtained on a just-in-time basis at class load time; and scanning, at run time with a byte code interpreting virtual machine running the application, classes before they are being loaded to determine the classes that comprise the application.

2. The method of claim 1, wherein the fingerprint for the application is obtained from a class path of the application.

3. The method of claim 1, further comprising inserting an agent that performs the scanning into the byte code interpreting virtual machine before the classes begin loading, wherein the agent performs the looking up whether the class is one of the broken classes before they are loaded, and the agent serves up the fixed class instead of the broken class to the virtual machine which loads the class for the application.

4. The method of claim 1, wherein the application is run in a context of the byte code interpreting virtual machine.

5. The method of claim 1, wherein the fixed classes to be substituted for the broken classes are served from a database.

6. The method of claim 1, wherein the fingerprint for the application is obtained based on a scan of the application external to a virtual machine on which the application is configured to be executed.

7. A computer that corrects a portion of an application, comprising:

an i/o interface operable to transmit and receive communications over at least a portion of a communication network; and a processor cooperatively operable with the i/o interface, and configured to facilitate:

determining a fingerprint, which is a single fingerprint that indicates plural different classes that collectively comprise the application, the fingerprint being a universal fingerprint from a component normalized to reduce the data introduced by a programmer and to retain a semantic character of component content;

referring to the plural different classes, indicated in the fingerprint, which collectively comprise the application, and looking up whether any of the plural different classes that comprise the application is a broken class;

for each of the plural different classes in the application which is determined to be the broken class:

substituting a fixed class for the broken class, when the broken class is loaded at class load time for the application, or substituting a fixed class method into the broken class, when the broken class is loaded at class load time for the application, or substituting fixed byte code for broken byte code corresponding to the broken class, when the broken class is loaded at class load time for the application, or replacing the broken class inside the static application with the fixed class, without replacing classes which are not broken, when the application is not running;

wherein the fingerprint for the application is obtained on a just-in-time basis at class load time; and scanning, at run time with a byte code interpreting virtual machine running the application in the processor, classes before they are being loaded to determine the classes that comprise the application.

8. The computer of claim 7, wherein the fingerprint for the application is obtained from a class path of the application.

9. The computer of claim 7, wherein the processor is configured to insert an agent that performs the scanning into the byte code interpreting virtual machine before the classes begin loading, wherein the agent in the processor performs the looking up whether the class is one of the broken classes before they are loaded, and the agent in the processor serves up the fixed class instead of the broken class to the virtual machine which loads the class for the application.

10. The computer of claim 7, wherein the application is run on the processor in a context of the byte code interpreting virtual machine.

11. The computer of claim 7, wherein the fixed classes to be substituted for the broken classes are served from a database.

12. The computer of claim 7, wherein the fingerprint for the application is obtained based on a scan of the application external to a virtual machine on which the application is configured to be executed.

13. A non-transitory computer-readable medium comprising instructions for execution by a computer, the instructions including a computer-implemented method for correcting a portion of an application, the instructions for implementing:

determining, in a computer, a fingerprint which is a fingerprint that indicates plural different classes that collectively comprise the application, the fingerprint being a universal fingerprint from a component normalized to reduce the data introduced by a programmer and to retain a semantic character of component content;

referring, in the computer, to the plural different classes, indicated in the fingerprint, that collectively comprise the application, and looking up whether any of the plural different classes that comprise the application is a broken class;

for each of the plural different classes in the application which is determined to be the broken class:

substituting a fixed class for the broken class, when the broken class is loaded at class load time for the application, or substituting a fixed class method into the broken class, when the broken class is loaded in the computer at class load time for the application, or substituting fixed byte code for broken byte code corresponding to the broken class, when the broken class is loaded in the computer at class load time for the application, or replacing the broken class inside the static application with the fixed class, without replacing classes which are not broken, when the application is not running;

wherein the fingerprint for the application is obtained on a just-in-time basis at class load time; and scanning, at run time with a byte code interpreting virtual machine running the application, classes before they are being loaded to determine the classes that comprise the application.

14. The non-transitory computer-readable medium of claim 13, wherein the fingerprint for the application is obtained from a class path of the application.

15. The non-transitory computer-readable medium of claim 13, further comprising inserting an agent that performs the scanning into the byte code interpreting virtual machine before the classes begin loading, wherein the agent performs the looking up whether the class is one of the broken classes before they are loaded, and the agent serves up the fixed class instead of the broken class to the virtual machine which loads the class for the application.

16. The non-transitory computer-readable medium of claim 13, wherein the application is run in a context of the byte code interpreting virtual machine.

17. The non-transitory computer-readable medium of claim 13, wherein the fixed classes to be substituted for the broken classes are served from a database.

18. The non-transitory computer-readable medium of claim 13, wherein the fingerprint for the application is obtained based on a scan of the application external to a virtual machine on which the application is configured to be executed.

19. The method of claim 1, further comprising unloading the broken class and then loading the fixed class in place of the broken class, while the application is running, when it is determined that the application is running.

20. The computer of claim 7, further comprising unloading the broken class and then loading the fixed class in place of the broken class, while the application is running, when it is determined that the application is running.

21. The non-transitory computer-readable medium of claim 13, further comprising unloading the broken class and then loading the fixed class in place of the broken class, while the application is running, when it is determined that the application is running.

\* \* \* \* \*